US008427524B2

(12) United States Patent
Jeong et al.

(10) Patent No.: US 8,427,524 B2
(45) Date of Patent: Apr. 23, 2013

(54) MESSAGE PROPAGATION-BASED STEREO IMAGE MATCHING SYSTEM

(75) Inventors: Hong Jeong, Pohang-shi (KR); Sung Chan Park, Pohang-shi (KR)

(73) Assignee: Postech Academy-Industry Foundation, Nam-gu, Pohang-shi (KR)

( * ) Notice: Subject to any disclaimer, the term of this patent is extended or adjusted under 35 U.S.C. 154(b) by 1027 days.

(21) Appl. No.: 12/312,246

(22) PCT Filed: Oct. 30, 2007

(86) PCT No.: PCT/KR2007/005377
§ 371 (c)(1),
(2), (4) Date: May 1, 2009

(87) PCT Pub. No.: WO2008/054109
PCT Pub. Date: May 8, 2008

(65) Prior Publication Data
US 2009/0315976 A1     Dec. 24, 2009

(30) Foreign Application Priority Data
Nov. 3, 2006    (KR) .................. 10-2006-0108525

(51) Int. Cl.
*H04N 15/00*    (2006.01)

(52) U.S. Cl.
USPC ................................ 348/42; 359/2

(58) Field of Classification Search .............. 348/42; 359/2
See application file for complete search history.

(56) References Cited

U.S. PATENT DOCUMENTS

| 2004/0151380 | A1* | 8/2004 | Jeong et al. ............ 382/217 |
| 2004/0247176 | A1 | 12/2004 | Aucsmith et al. |
| 2005/0123191 | A1* | 6/2005 | Zhang et al. ............ 382/154 |
| 2006/0055703 | A1* | 3/2006 | Jeong et al. ............ 345/560 |

FOREIGN PATENT DOCUMENTS

| JP | 2005084698 | 3/2005 |
| JP | 2006047252 | 2/2006 |
| JP | 2006079584 | 3/2006 |

OTHER PUBLICATIONS

Ieee Transactions on systems, Man and Cybernetics, vol. 19, No. 6, Nov./Dec. 1989, "Structure from Stereo-A Review", Umesh R. Dhono, Student Member, Ieee and J.K.Aggarwal, Fellow, Ieee.
International Journal of Computer Vision 47(1/2/3),7-42, 2002, "A Taxonomy and Evaluation of Dense Two-Frame Stereo Correspondence Algorithms", Daniel Scharstein and Richard Szeliski.

* cited by examiner

*Primary Examiner* — Jude Jean Gilles
*Assistant Examiner* — Jaren M Means
(74) *Attorney, Agent, or Firm* — Bacon & Thomas, PLLC

(57) ABSTRACT

A stereo image matching system includes an image processing unit for converting input images inputted from a first and a second image acquisition unit into digital signals to output first and second pixel data; and an image matching unit for computing at least two of an upward, a downward, a forward and a backward message of each pixel by using data values of the first and the second pixel data that are located on a same epipolar line to calculate a disparity value of each pixel by using the computed messages corresponding to adjacent pixel(s). The stereo image matching system employs a parallel pipeline VLSI configuration with a time complexity of O(N). Thus, a plurality of image lines are used for matching, so that correct distance image information is obtained regardless of the conditions of the surrounding environment.

21 Claims, 23 Drawing Sheets

MESSAGE PROPAGATION-BASED STEREO IMAGE MATCHING SYSTEM

TECHNICAL FIELD

The present invention relates to a message propagation-based stereo image matching system and, more particularly, to a message propagation-based real-time parallel stereo matching system, which uses a multi-line or full image line processing method.

BACKGROUND ART

As well known to those skilled in the art, stereo matching is a method of reconstructing three-dimensional spatial information from a pair of two-dimensional images. As shown in FIG. 1, stereo matching is a method of detecting a left and a right side pixel corresponding to a specific location (X, Y, Z) in three-dimensional space from image lines of epipolar lines on a right and a left side image, respectively. The disparity d between a pair of the corresponding pixels is defined by the equation $d = x^r - x^l$.

The disparity conveys distance information, and the geometrical characteristic referred to as a "depth" can be calculated therefrom. Therefore, if the disparity is calculated from input images in real time, three-dimensional distance information and shape information in an observation space can be measured.

The basic concept of the stereo matching method is disclosed in a thesis by Dhond, et al. (Umesh R. Dhond and J. K. Aggarwal, Configuration from Stereo—a review, IEEE Transactions on Systems, Man, and Cybernetics, 19(6):553-572, November/December 1989); and the latest stereo matching algorithm is summarized well in a thesis by Szeliski (D. Scharstein and R. Szeliski. A Taxonomy and Evaluation of Dense Two-Frame Stereo Correspondence Algorithms. IJCV 47(1/2/3):7-42, April-June 2002).

The stereo matching method includes a technique based on a winner-take-all process using a local cost; and a technique for establishing a global energy model and performing energy minimization on the basis thereof. By using the winner-take-all process, the stereo matching can be performed in a single scan line and the processing speed can be enhanced, but has a very large disparity error. The global energy model technique typically includes a graph cut technique, a belief propagation technique, etc. Both the graph cut technique and the belief propagation technique are based on energy minimization and exhibit excellent results, but require very long processing times. That is, the belief propagation technique exhibits excellent stereo matching results having small error by using the relation between upper and lower lines. In the belief propagation technique, messages are received from an adjacent processor during each sequence to be computed, and the computed messages are sent to an adjacent processor. Therefore, if the belief propagation technique is implemented as a hardware device to perform a high-speed parallel processing, the processing time can be shortened. Further, the belief propagation technique is configured such that messages are transferred from a current pixel position to an adjacent pixel position in a forward, a backward, an upward, and a downward direction, respectively.

However, although the above-described conventional real-time algorithms can perform a high-speed processing, they have large disparity matching errors. Further, since the conventional belief propagation technique is a sequential software algorithm, it has a small disparity matching error, but requires a long processing time.

DISCLOSURE OF INVENTION

Technical Problem

It is, therefore, an object of the present invention to provide a stereo matching method employing a new parallel pipelined algorithm that can be easily implemented in a single chip based on the principle of the belief propagation algorithm using a plurality of scan lines, thus enhancing the adaptiveness to the surrounding environment and the processing speed while reducing the disparity noise and the production cost.

Technical Solution

In accordance with an embodiment of the present invention, there is provided a stereo image matching system, including an image processing unit for converting input images inputted from a first and a second image acquisition unit into digital signals to output first and second pixel data; and an image matching unit for computing at least two of an upward, a downward, a forward and a backward message of each pixel by using data values of the first and the second pixel data that are located on a same epipolar line to calculate a disparity value of each pixel by using the computed messages corresponding to adjacent pixel(s).

BRIEF DESCRIPTION OF THE DRAWINGS

The above and other objects and features of the present invention will become apparent from the following description of embodiments given in conjunction with the accompanying drawings, in which.

BEST MODE FOR CARRYING OUT THE INVENTION

Hereinafter, embodiments of the present invention will be described in detail with reference to the accompanying drawings. The present invention has a parallel pipeline configuration for computing an upward, a downward, a forward and a backward message of each pixel in order to compute disparity values for the respective pixels in an image by having processors send and receive the computed messages corresponding to adjacent pixels. Further, the present invention has a configuration can be implemented by a Very Large-Scale Integration (VLSI) for computation of respective messages.

Figure 1:
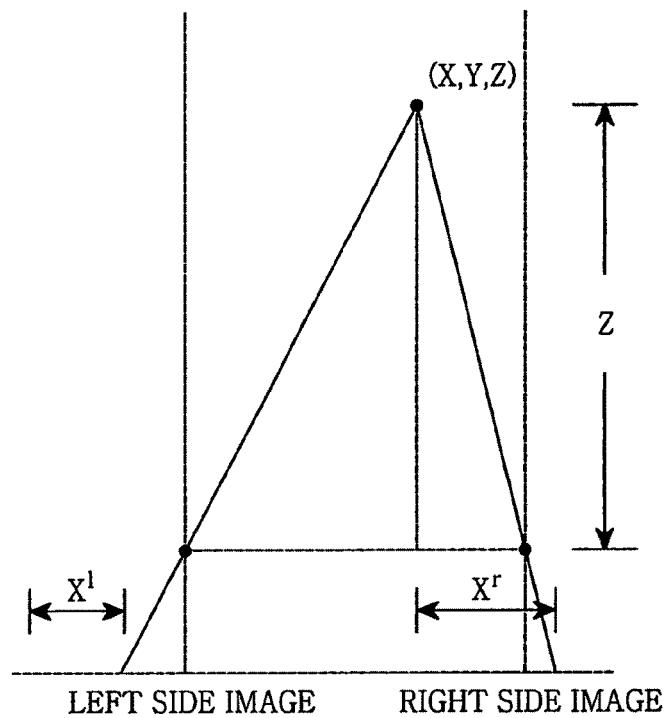
FIG. 1 shows a conceptual diagram of stereo image matching.
Figure 2:
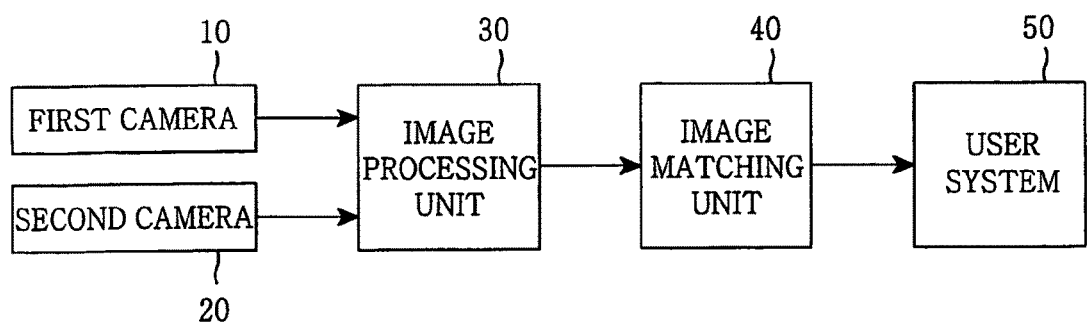
FIG. 2 presents a block diagram showing a message propagation-based real-time parallel stereo matching system using a multi-line or full image line processing method in accordance with the present invention.

FIG. 2 is a block diagram showing a message propagation-based real-time parallel stereo matching system using a multi-line or full image line processing method in accordance with the present invention.

As shown in the drawing, the parallel stereo matching system in accordance with the present invention includes an image processing unit 30 for converting images inputted from first and second cameras 10 and 20, which are image acquisition means, into digital signals, and thus outputting first and second pixel data; and an image matching unit 40 for computing specific messages using first and second pixel data on the same epipolar line, and outputting determined values to a user system 50 using the computed messages. In this case, the first and second pixel data are preferably pixel data existing in right and left image lines of the same epipolar line.

The image matching unit 40 varies mainly depending on algorithms I, II, III and IV.

First, symbols that will be used in later description are summarized below.

Hereinafter, $t_f$ denotes a forward processing time, $t_b$ denotes a backward processing time, $t_u$ denotes an upward processing time, $t_d$ denotes a downward processing time, $t_o$ denotes a disparity computation time, and $t_{all}$ denotes the total time required for forward, backward, upward and downward processing and disparity computation. The times $t_f$, $t_b$, $t_u$, $t_d$, $t_o$, and $t_{all}$ can be of a same length when parallel processing is performed.

Figure 3:
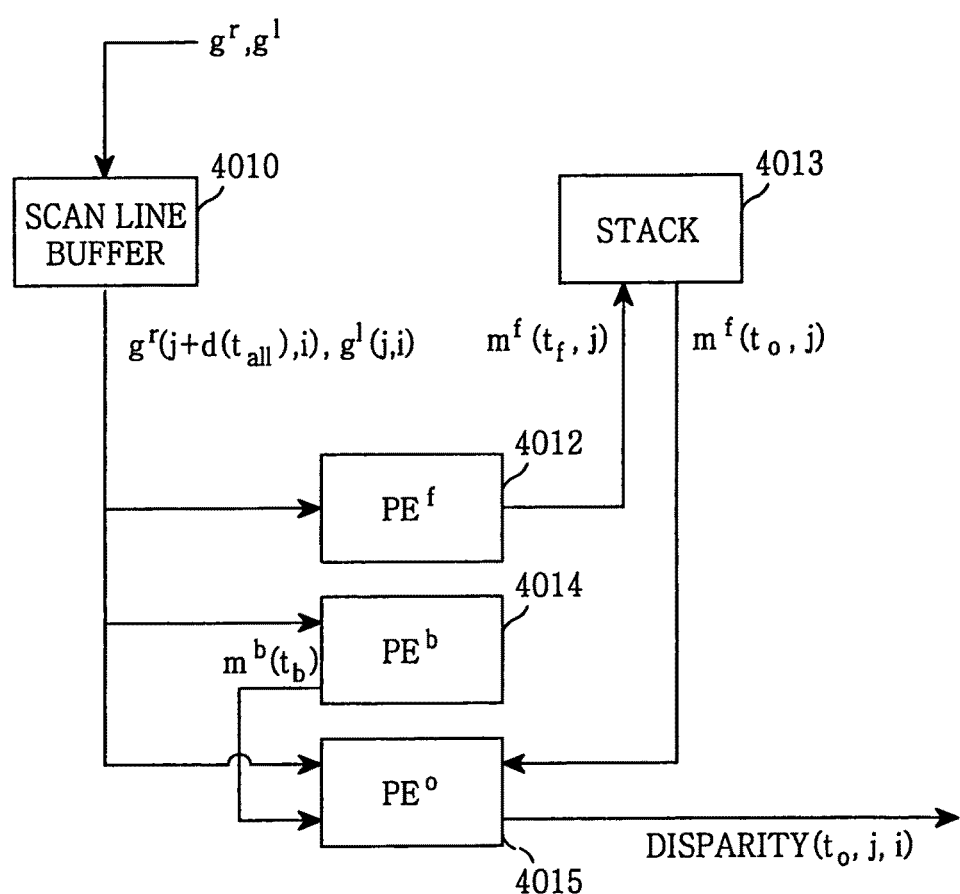
FIG. 3 offers a block diagram of an image matching unit for performing an algorithm I in accordance with a first embodiment of the present invention.

FIG. 3 is a block diagram of an image matching unit 40 for performing an algorithm I in accordance with a first embodiment of the present invention.

Right and left side pixel data $g^r(j+d(t_{all}),i)$ and $g^1(j,i)$ are stored in a scan line buffer 4011. Further, a forward processor $PE^f$ 4012 receives the right and the left side image pixel data, and stores a message $m^f(t_f,j)$ computed by using the image pixel data values in a stack 4013. When a backward processor $PE^b$ 4014 also receives the right and the left side image pixel data $g^r(j+d(t_{all}),i)$ and $g^1(j,i)$, and sends a message $m^b(t_b)$ computed by using the image pixel data to a disparity computation processor $PE^o$ 4015, the disparity computation processor $PE^o$ 4015 receives the forward message $m^f(t_f,j)$ stored in the stack 4013 from the stack 4013, the backward message $m^b(t_b)$ and the right and the left side image pixel data, and thus outputs a disparity value.

Figure 4:
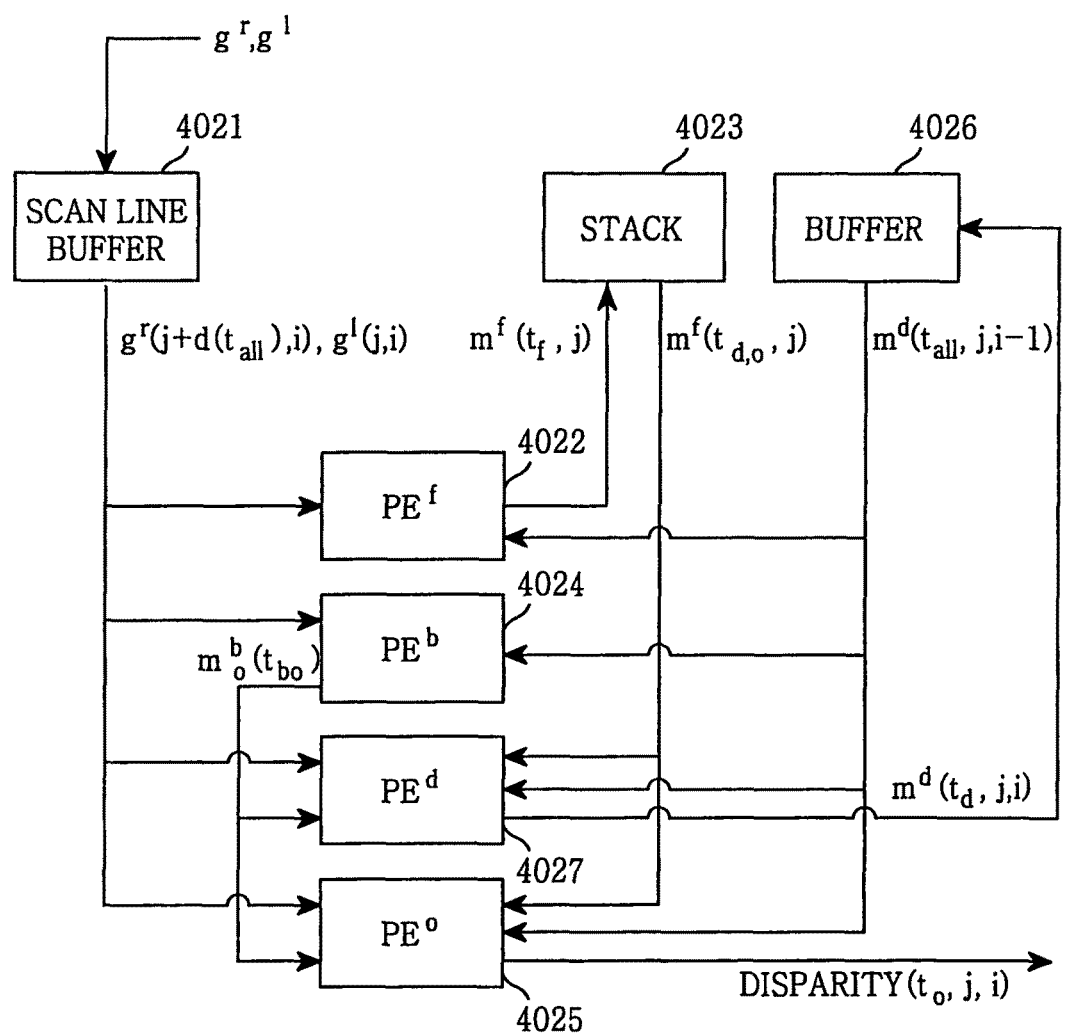
FIG. 4 provides a block diagram of an image matching unit for performing an algorithm II in accordance with a second embodiment of the present invention.

FIG. 4 is a block diagram of an image matching unit 40 for performing an algorithm II in accordance with a second embodiment of the present invention.

Right and left side image pixel data $g^r(j+d(t_{all}),i)$ and $g^1(j,i)$ are stored in a scan line buffer 4021. A forward processor $PE^f$ 4022 receives the right and the left side image pixel data from the scan line buffer 4021, a downward message $m^d(t_{all},j,i-1)$ computed for an upper line from a buffer 4026, and stores a forward message $m^f(t_f,j)$ computed by using the received image pixel data and downward message in a stack 4023. When a backward processor $PE^b$ 4024 also receives the right and the left side image pixel data $g^r(j+d(t_{all}),i)$ and $g^1(j,i)$ and the downward message $m^d(t_{all},j,i-1)$, and sends a backward message $m^b(t_b)$ computed by using the image pixel data and the downward message to a disparity computation processor $PE^o$ 4025, the disparity computation processor $PE^o$ 4025 receives the forward message $m^f(t_f,j)$ from the stack 4023, the backward message $m^b(t_b)$, the downward message, and the right and the left side image pixel data, and thus outputs a disparity value. The downward processor $PE^d$ 4027 receives the downward message for the upper line, the backward message, the forward message, and the image pixel data, computes a downward message $m^d(t_d,j,i)$, and stores the downward message in the buffer 4026.

Figure 5:
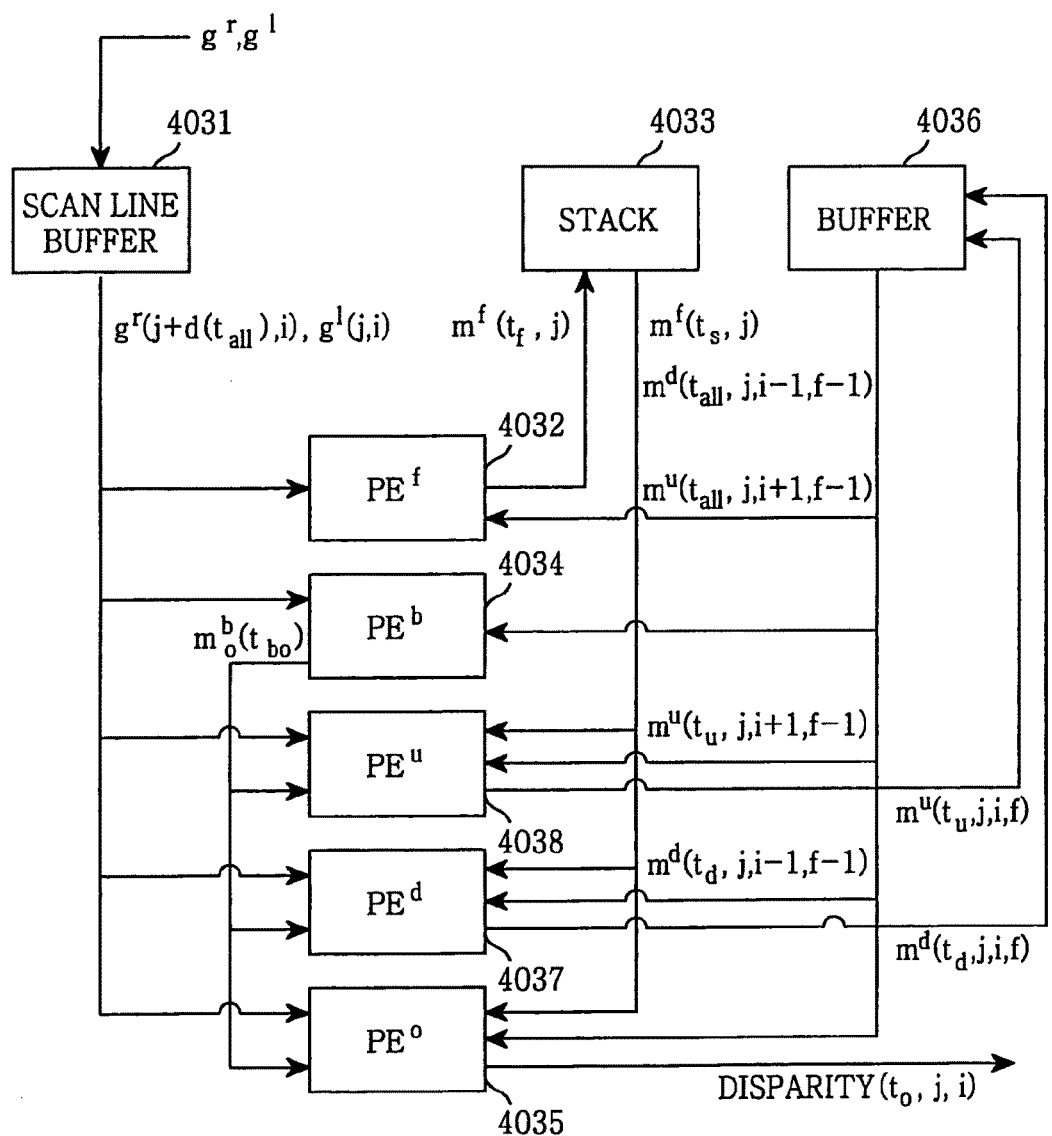
FIG. 5 is a block diagram of an image matching unit for performing an algorithm III in accordance with a third embodiment of the present invention.

FIG. 5 is a block diagram of an image matching unit 40 for performing an algorithm III in accordance with a third embodiment of the present invention. The algorithm III has an iterative computation structure, in which an iteration loop is represented by f.

Right and left side image pixel data $g^r(j+d(t_{all}),i)$ and $g^1(j,i)$ are stored in a scan line buffer 4031. Further, a forward processor $PE^{all}$ 4032 receives the right and the left side image pixel data $g^r(j+d(t_{all}),i)$ and $g^1(j,i)$ from the scan line buffer 4031, upward and downward message values $m^u(t_{all},j,i+1,f-1)$ and $m^d(t_{all},j,i-1,f-1)$ computed respectively for a lower line and an upper line in a previous iteration loop from a buffer 4036, computes a forward message $m^f(t_f,j)$, and stores the forward message value in a stack 4033. When a backward processor $PE^b$ 4034 also receives the right and the left side image pixel data and the upward and downward messages and sends a backward message $m^b(t_b)$ computed by using the received image pixel data and messages to a disparity computation processor $PE^o$ 4035, the disparity computation processor $PE^o$ 4035 receives the forward message stored in the stack 4033, the backward message, the upward message, the downward message, and the right and the left side image pixel data, and thus outputs a disparity value. A downward processor $PE^d$ 4037 receives the downward message for the upper line, the backward message, the forward message, and the image pixel data, computes a new downward message $m^d(t_d, j,i,f)$, and stores the downward message in the buffer 4036. An upward processor $PE^u$ 4038 receives the upward message for the lower line, the backward message, the forward message, and the image pixel data, computes a new upward message $m^u(t_u,j,i,f)$, and stores the upward message in the buffer 4036.

Figure 6:
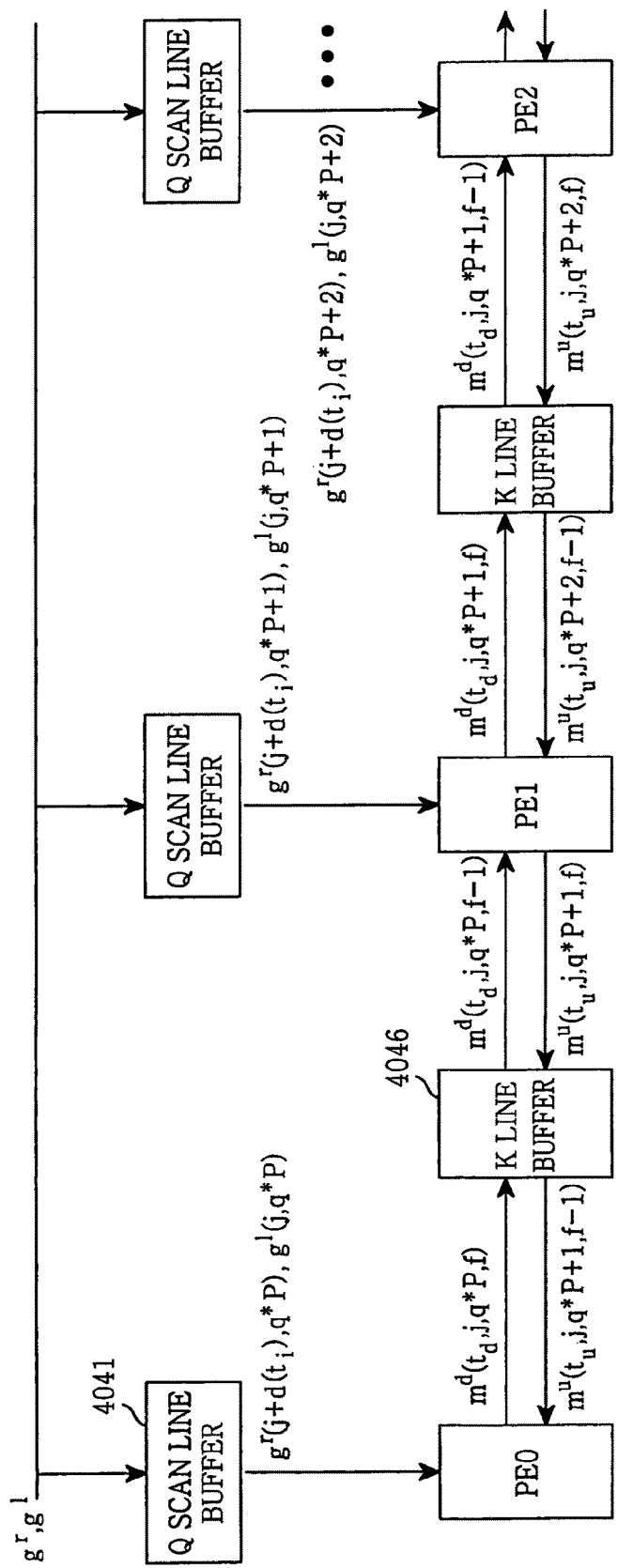
FIG. 6 shows a block diagram of an image matching unit for performing an algorithm IV in accordance with a fourth embodiment of the present invention.

FIG. 6 is a block diagram of an image matching unit 40 for performing an algorithm IV in accordance with a fourth embodiment of the present invention. The algorithm IV has an iterative computation structure, in which an iteration loop is represented by f. Further, p number of processors PE-0, PE 1, PE2, PE2, ... perform parallel processing for high-speed processing.

The right and the left side image pixel data are inputted from camera images and stored in a scan line buffer 4041. The processors PE0, PE1, PE2, ... for P number of respective lines are arranged in a parallel manner, and simultaneously process the P number of lines and then simultaneously process subsequent P number of lines if processing has been terminated. Therefore, as shown in FIG. 6, in the P number of lines, a first processor performs first line processing, and a p-th processor performs p-th line processing. In this way, a single entire image is processed only after processing is performed a total of N/P times when the number of image lines is N. Each processor receives right and left side image pixel data $g^r(j+d(t_{all}),q*P+p)$ and $g^l(j,q*P+p)$ from the scan line buffer 4041, a downward message $m^d(t_d,j,q*P+p,f)$ from an upper buffer 4046 to communicate with adjacent processors, and an upward message $m^u(t_u,j,q*P+p,f)$ from a lower buffer 4046, processes the received messages, and stores the upward message in the upper buffer 4046 and the downward message in the lower buffer 4046. All processors perform parallel processing while sending and receiving messages at high speed in this way.

Figure 7:
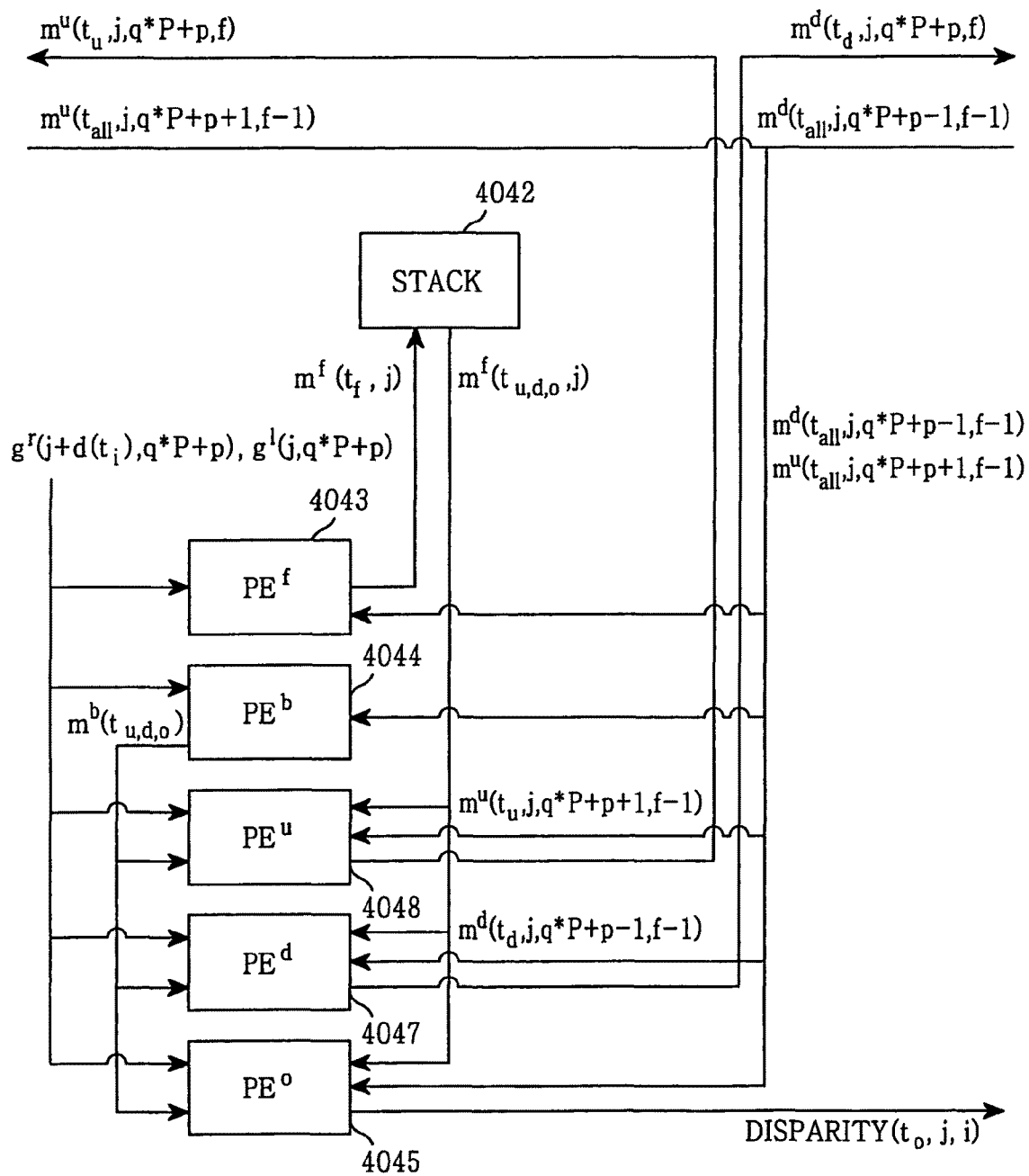
FIG. 7 provides a block diagram showing an internal configuration of each processor for processing respective lines in the image matching unit for performing the algorithm IV in accordance with the fourth embodiment of the present invention.

FIG. 7 is a diagram showing the internal configuration of each of the processors PE0, PE1, PE2, ... for processing respective lines in the image matching unit for performing the algorithm IV in accordance with the fourth embodiment of the present invention.

A forward processor $PE^f$ 4042 receives right and left side image pixel data $g^r(j+d(t_{all}),q*P+p)$ and $g^l(j,q*P+p)$, an upward message value $m^u(t_{all},j,q*P+p+1,f-1)$ and a downward message value $m^d(t_{all},j,q*P+p-1,f-1)$, which are computed for a lower line and an upper line, respectively, in a previous iteration loop, computes a forward message value $m^f(t_f,j)$, and stores the forward message value in a stack 4043. When a backward processor $PE^b$ 4044 also receives the right and the left side image pixel data and the upward and downward messages, and sends a backward message $m^b(t_b)$ computed by using the received image pixel data and messages to a disparity computation processor $PE^o$ 4045, the disparity computation processor $PE^o$ 4045 receives the forward message stored in the stack 4043, the backward, upward, and downward messages, and the right and the left side image pixel data, and thus outputs a disparity value. A downward processor $PE^d$ 4047 receives the downward message for the upper line, the backward and forward messages, and the image pixel data, and thus computes a new downward message. An upward processor $PE^u$ 4048 receives the upward message for the lower line, the backward and forward messages, and the image pixel data, and thus computes a new upward message.

Figure 8:
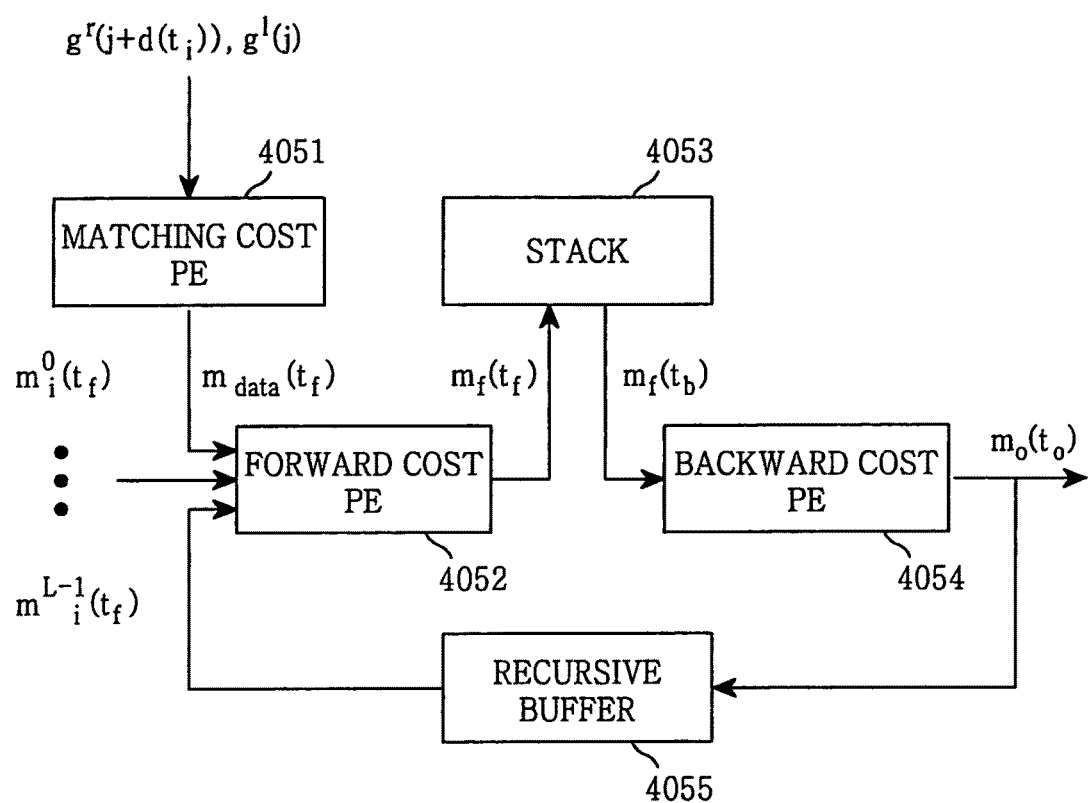
FIG. 8 presents a block diagram showing the internal configuration of forward, backward, upward and downward processors constituting the image matching unit in accordance with the present invention.

FIG. 8 is a diagram showing the internal configuration of the forward, backward, upward and downward processors, constituting the image matching unit 40 in the real-time parallel stereo matching system in accordance with the present invention.

Each of the processors is configured to compute a message, and includes a matching cost processor 4051 for receiving the right and the left side image pixel data $g^r(j+d(t_i))$ and $g^l(j)$ to compute a matching cost, a forward cost processor 4052 for receiving the matching cost and multiple message values to compute a forward cost, a stack 4053 for receiving and storing the forward cost, a backward cost processor 4054 for receiving the forward cost from the stack 4053 to compute a backward cost, and a recursive buffer 4055 for allowing the backward cost to be recursively used for subsequent processing.

Figure 9:
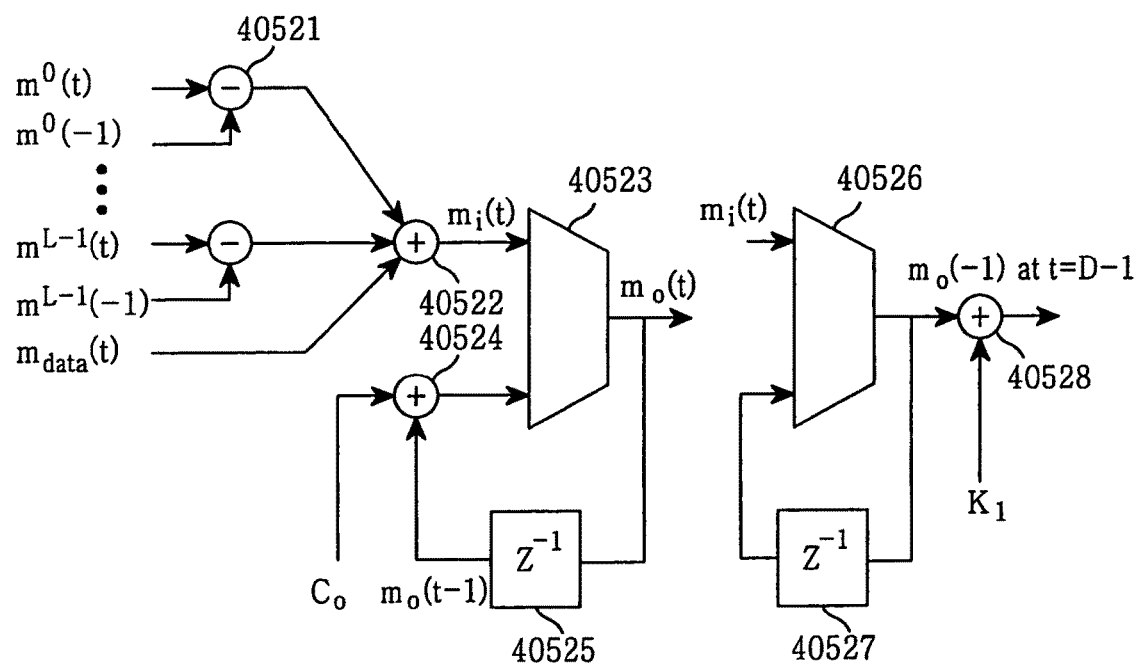
FIG. 9 is a block diagram showing the internal configuration of a forward cost processor in accordance with the present invention.

FIG. 9 is a diagram showing the internal configuration of the forward cost processor 4052 in accordance with the present invention. In FIG. 9, the forward cost processor is shown as being divided into two circuits for simplicity, but, actually, the forward cost processor is configured by a single circuit.

The forward cost processor 4052 includes subtractors 40521 for subtracting input parameters from input messages, respectively, a first adder 40522 for adding the output values of respective subtractors 40521 to matching cost, a comparator 40523 for outputting the lower value between the output value of the first adder 40522 and the output value of a second adder 40525, a first delay buffer 40524 for delaying the output value of the comparator 40523 by 1 clock, the second adder 40525 for adding a cost $C_0$ to the output value of the first delay buffer 40524, a second comparator 40526 for comparing the output value of the first adder 40522 with another input value and outputting the lower value between the two values, a second delay buffer 40527 for delaying the result value of the second comparator 40526 by 1 clock and providing the delayed result value to the second comparator 40526 as another input value, and a third adder 40528 for adding the output value of the second comparator 40526 to cost $K_1$ and outputting the added value.

Figure 10:
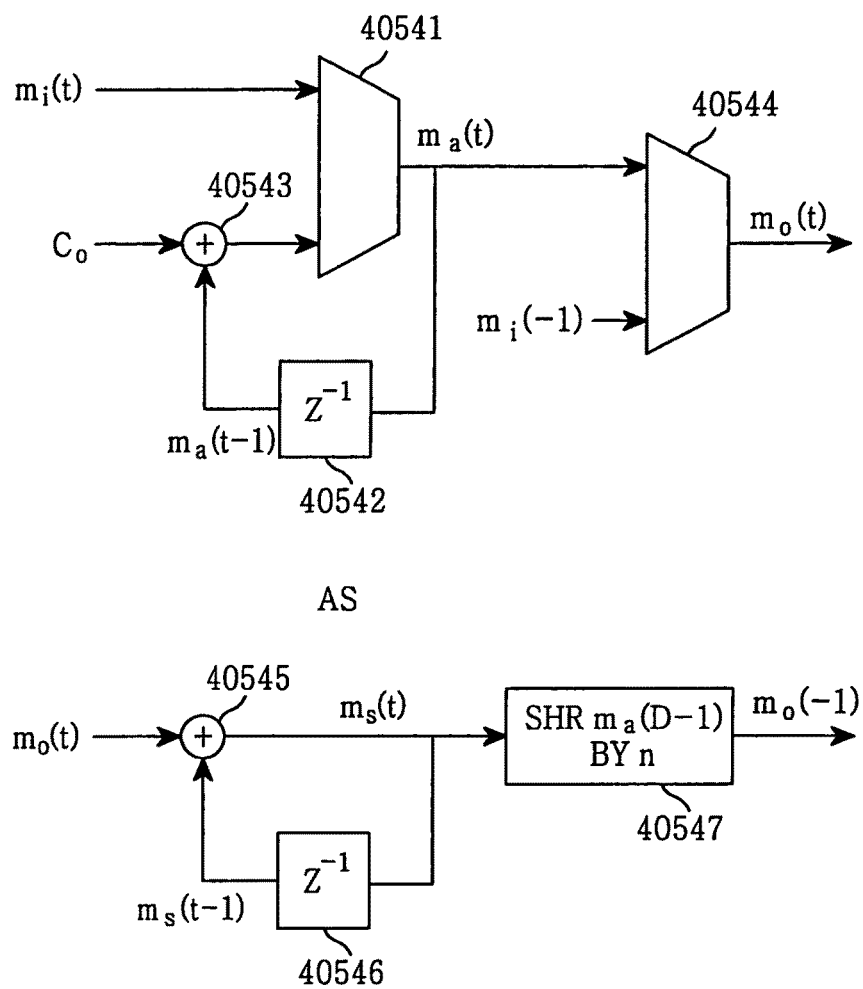
FIG. 10 offers a block diagram showing the internal configuration of a backward cost processor in accordance with the present invention.

FIG. 10 is a diagram showing the internal configuration of the backward cost processor 4054 in accordance with the present invention. In FIG. 10, the backward cost processor 4054 is shown as being divided into two circuits for easy depiction, but, actually, the backward cost processor is configured by a single circuit.

The backward cost processor 4054 includes a first comparator 40541 for selecting the lower value between the input cost and the output value of a first adder 40543, a first delay buffer 40542 for delaying the output value of the first comparator 40541 by 1 clock and providing the delayed output value to the first adder 40543, the first adder 40543 for adding a cost value $C_0$ to the output value of the first delay buffer 40542, a second comparator 40544 for comparing the output value of the first comparator 40541 with an input parameter value, and outputting the lower value of the two values, a second adder 40545 for adding the output value of the second comparator 40544 to the output value of a second delay buffer 40546, the second delay buffer 40546 for delaying the output value of the second adder 40545 by 1 clock and providing the delayed output value to the second adder 40545 as an input value, and a shifting unit 40547 for shifting the output value of the second adder 40545 by a certain amount and outputting the shifted value as a parameter.

Figure 11:
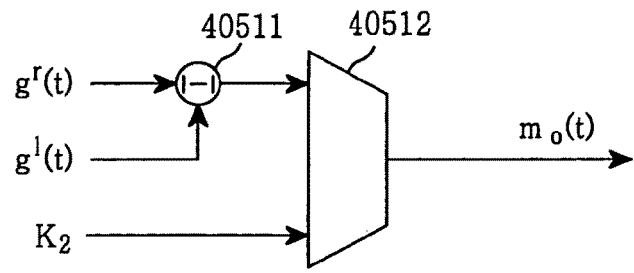
FIG. 11 provides a block diagram showing the internal configuration of a matching cost processor in accordance with the present invention.

FIG. 11 is a diagram showing the internal configuration of the matching cost processor 4051 in accordance with the present invention.

The matching cost processor 4051 includes an absolute difference computation unit 40511 for receiving right and left side image pixel data to compute the absolute value of the difference between the two image pixel data values, and a comparator 40512 for comparing the output value of the absolute difference computation unit 40511 with a parameter $K_2$ to output the lower value of the two values.

Figure 12:
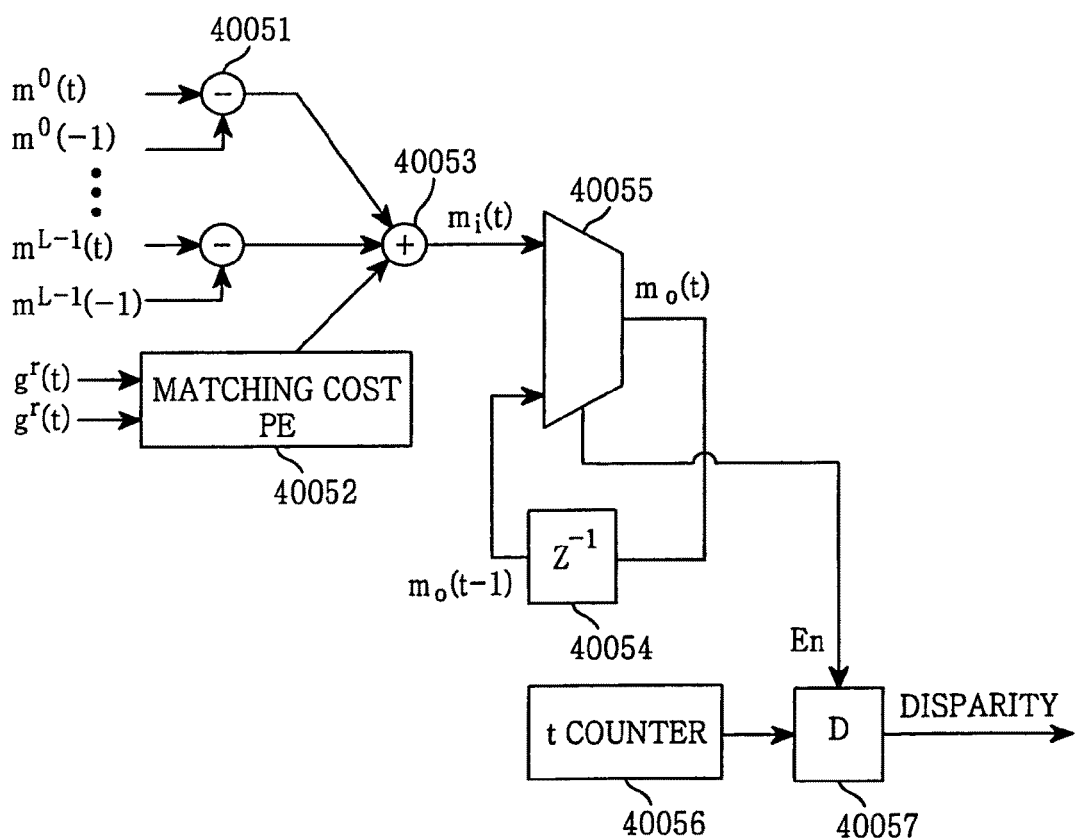
FIG. 12 is a block diagram showing the internal configuration of a disparity computation processor in the image matching unit in accordance with the present invention.

FIG. 12 is a diagram showing the internal configuration of the disparity computation processors 4015, 4025, 4035, and 4045 in the image matching unit 40 in the real-time parallel stereo matching system in accordance with the present invention.

Each of the computation processors includes subtractors 40051 for subtracting input parameters from corresponding input messages, a matching cost processor 40052 for computing matching cost by using right and left side image pixel data, an adder 40053 for adding the output values of respective subtractors 40051 to the output value of the matching cost processor 40052, a delay buffer 40054 for delaying the output value of a comparator 40055 by 1 clock, the comparator 40055 for outputting the lower value between the output value of the delay buffer 40054 and the output value of the adder 40053, a T-counter 40056 for indicating the steps of disparity computation processing, and a disparity output buffer 40057 for storing the value of the T-counter 40056 when the value input from the adder 40053 is the lower value between the two input values of the comparator 40055.

Hereinafter, the operating sequence of the real-time parallel stereo matching system in accordance with the present invention for respective components will be described in detail.

Figure 13:
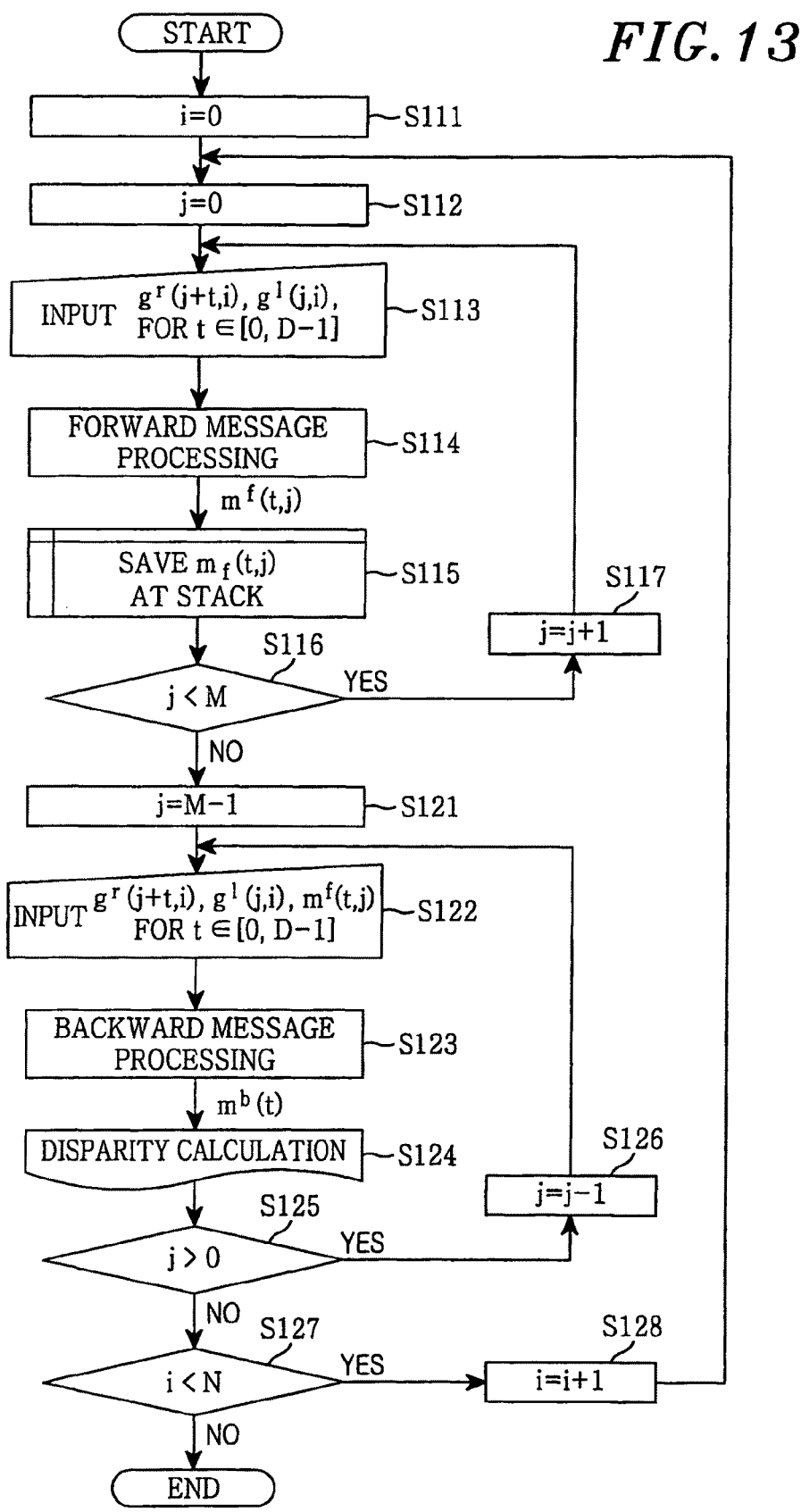
FIG. 13 shows a flow chart of the operating process of the image matching unit for performing the algorithm I in accordance with the first embodiment of the present invention.

FIG. 13 is a flow chart showing the operating process of the image matching unit 40 for performing the algorithm I in accordance with the first embodiment of the present invention.

When the number of image lines is N, and the number of pixels in one line is M, computation is individually performed on an i-th image line and a j-th pixel in the line. In the i-th line, the present algorithm is performed forward on the j-th pixel in the sequence of 0 to M−1 at steps S111 to S117, and then performed backward on the j-th pixel in the sequence of M−1 to 0 at steps S121 to S128. In forward processing, the forward processor of FIG. 3 receives right and left side image pixel data values, computes a forward message value at step S114, and stores the forward message value in a stack at step S115. Further, in backward processing, the backward processor of FIG. 3 receives right and left side image pixel data values, and computes a backward message value at step S123, and the disparity computation processor of FIG. 3 reads the backward message value, and the forward message value from the stack, and computes a disparity value at step S124.

Figure 14:
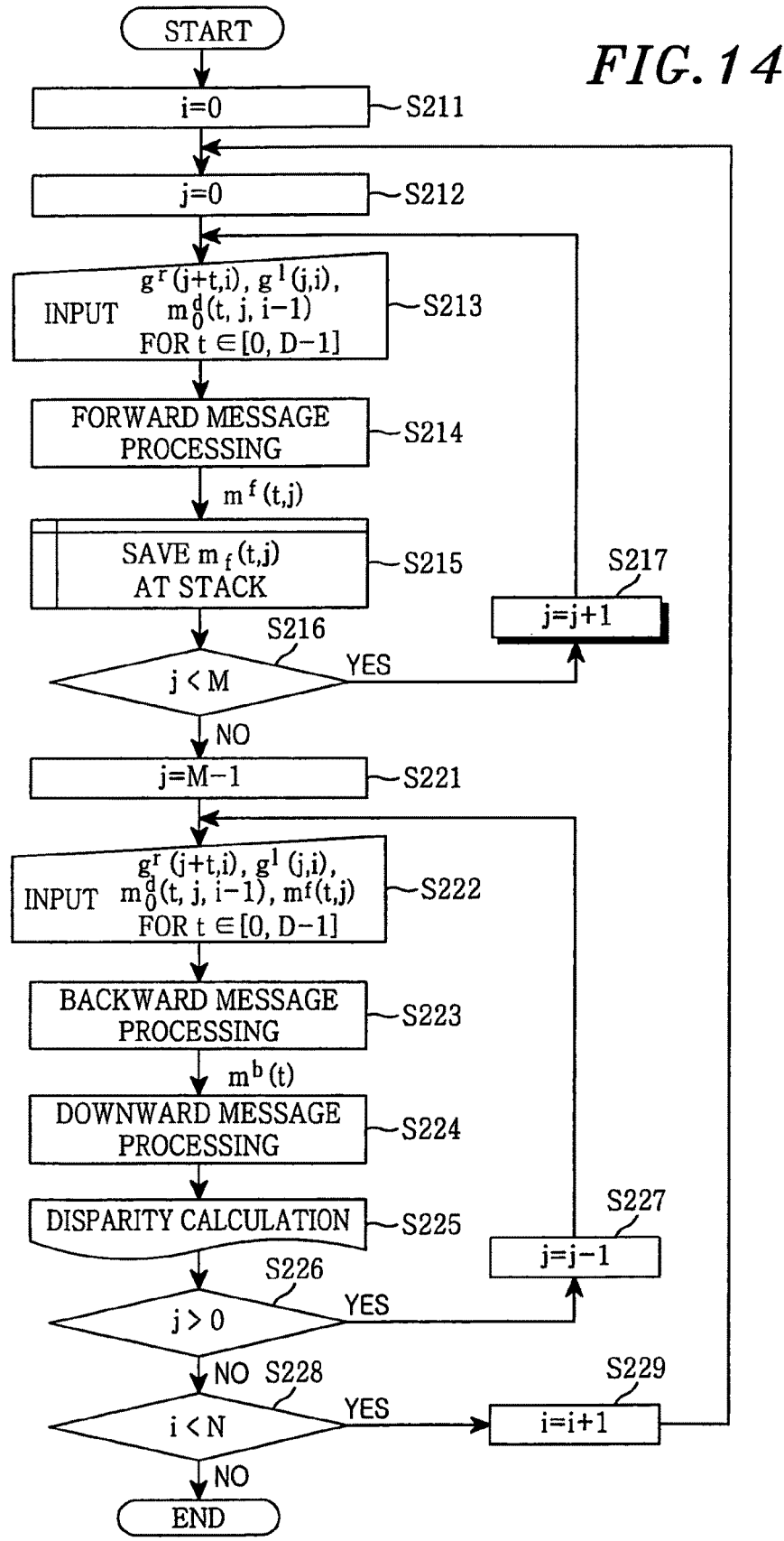
FIG. 14 illustrates a flow chart showing the operating process of the image matching unit for performing the algorithm II in accordance with the second embodiment of the present invention.

FIG. 14 is a flow chart showing the operating process of the image matching unit 40 for performing the algorithm II in accordance with the second embodiment of the present invention.

Computation is individually performed on an i-th image line and a j-th pixel in the image line. In the i-th image line, the present algorithm is performed forward on the j-th pixel in the sequence of 0 to M−1 at steps S211 to S217, and is performed backward on the j-th pixel in the sequence of M−1 to 0 at steps S221 to S229. In the forward processing, the forward processor of FIG. 4 receives right and left side image pixel data values and a downward message value for an upper line, computes a forward message value at step S214, and stores the forward message value in a stack at step S215. Further, in the backward processing, the backward processor of FIG. 4 receives the right and the left side image pixel data values and the downward message value for the upper line, and computes a backward message value at step S223. The downward processor of FIG. 4 receives the right and the left side image pixel data values, the forward and backward messages, and the downward message for the upper line, and computes a downward message value for a current line at step S224. The disparity computation processor of FIG. 4 reads the downward, backward and forward message values and thus computes a disparity value at step S225.

Figure 15:
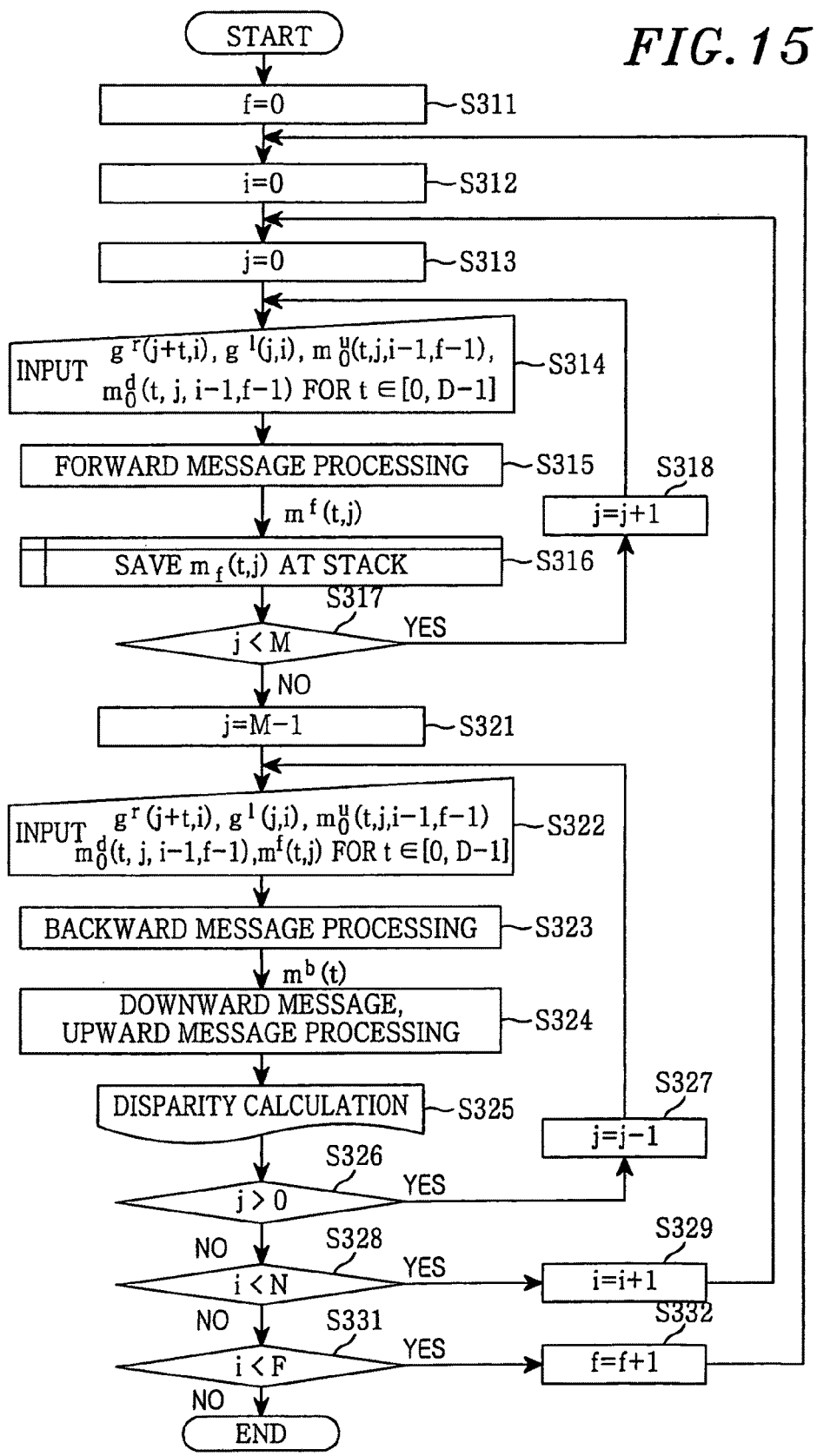
FIG. 15 depicts a flow chart showing the operating process of the image matching unit for performing the algorithm III in accordance with the third embodiment of the present invention.

FIG. 15 is a flow chart showing the operating process of the image matching unit 40 for performing the algorithm III in accordance with the third embodiment of the present invention.

Computation is individually performed on an f-th iteration loop, an i-th image line in the step, and a j-th pixel in the image line. The present algorithm is repeatedly performed on the entire image F times, thus reducing noise in a disparity image. In an i-th line, the algorithm is performed forward on the j-th pixel in the sequence of 0 to M−1 at steps S311 to S318, and is then performed backward on the j-th pixel in the sequence of M−1 to 0 at steps S321 to S332. In the forward processing, the forward processor of FIG. 5 receives right and left side image pixel data values, a downward message value for an upper line in an (f−1)-th iteration loop, and an upward message value for a lower line in the (f−1)-th iteration loop, computes a forward message value at step S315, and stores the forward message value in a stack at step S316. Further, in the backward processing, the backward processor of FIG. 5 receives the right and the left side image pixel data values, the downward message value for the upper line in the (f−1)-th iteration loop, and the upward message value for the lower line in the (f−1)-th iteration loop, and thus computes a backward message value at step S323. The downward processor of FIG. 5 receives the right and the left side image pixel data values, the forward and backward message values, and the downward message value for the upper line in the (f−1)-th iteration loop, and then computes a downward message value for a current line at step S324. The upward processor of FIG. 5 receives the right and the left side image pixel data values, the forward and backward message values, and the upward message value for the lower line in the (f−1)-th iteration loop, and thus computes an upward message value for a current line at step S324. The disparity computation processor of FIG. 5 reads the upward and downward message values computed in the (f−1)-th iteration loop, and the backward and forward message values, and thus computes a disparity value at step S325.

Figure 16:
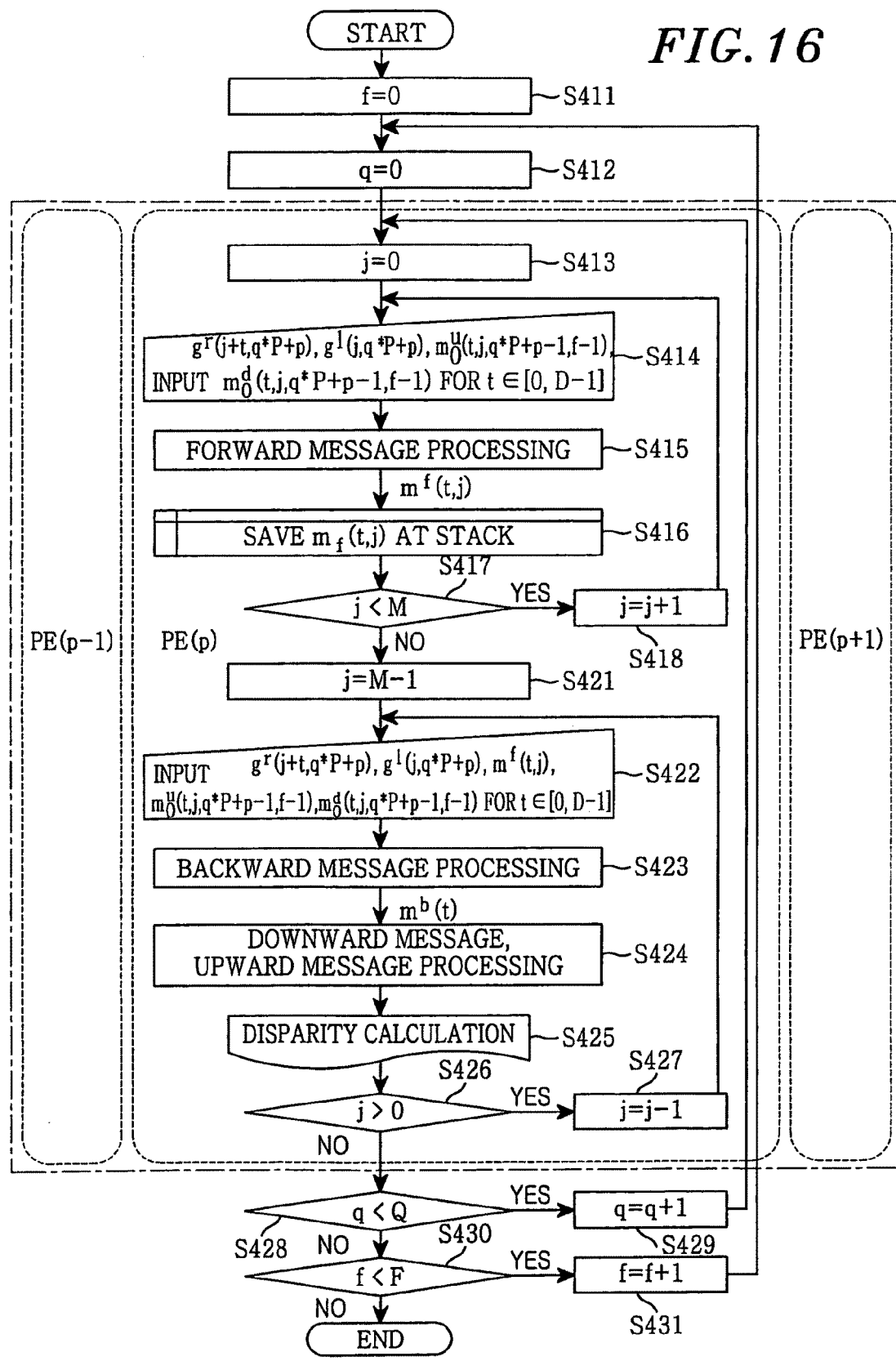
FIG. 16 is a flow chart showing the operating process of the image matching unit for performing the algorithm IV in accordance with the fourth embodiment of the present invention.

FIG. 16 is a flow chart showing the operating process of the image matching unit 40 for performing the algorithm IV in accordance with the fourth embodiment of the present invention.

The algorithm is repeatedly performed on the entire image F times, and P number of processors perform processing in parallel for high-speed processing. That is, this algorithm is configured to process the algorithm III in parallel at a high speed. Processors for respective image lines are arranged in a parallel manner, simultaneously process the P number of lines and then subsequent P number of lines. Therefore, as shown in FIG. 6, in P lines, a first processor performs first line processing, and a p-th processor performs p-th line processing. In this way, when the number of image lines in a single image is N, the entire image is completely processed only if the processing is performed a total of Q=N/P times.

In an i-th line, the processing is performed forward on the j-th pixel in the sequence of 0 to M−1 at steps S411 to S418, and then backward on the j-th pixel in the sequence of M−1 to 0 at steps S421 to S431. In the forward processing, the forward processor of FIG. 7 receives right and left side image pixel data values, a downward message value for an upper line in an (f−1)-th iteration loop, and an upward message value for a lower line in the (f−1)-th iteration loop, computes a forward message value at step S415, and stores the forward message value in a stack at step S416. Further, in the backward processing, the backward processor of FIG. 5 receives the right and the left side image pixel data values, the downward message value for the upper line in the (f−1)-th iteration loop, and the upward message value for the lower line in the (f−1)-th iteration loop, and thus computes a backward message value at step S423. The downward processor of FIG. 7 receives the right and the left side image pixel data values, the forward and backward message values, and the downward message value for the upper line in the (f−1)-th iteration loop, and thus computes a downward message value for a current line at step S424. The upward processor of FIG. 7 receives the right and the left side image pixel data values, the forward and backward message values, and the upward message value for the lower line in the (f−1)-th iteration loop, and thus computes an upward message value for a current line at step S424. The disparity computation processor of FIG. 5 reads the upward and downward message values in the (f−1)-th iteration loop, and the backward and forward message values, and thus computes a disparity value at step S425.

Figure 17:
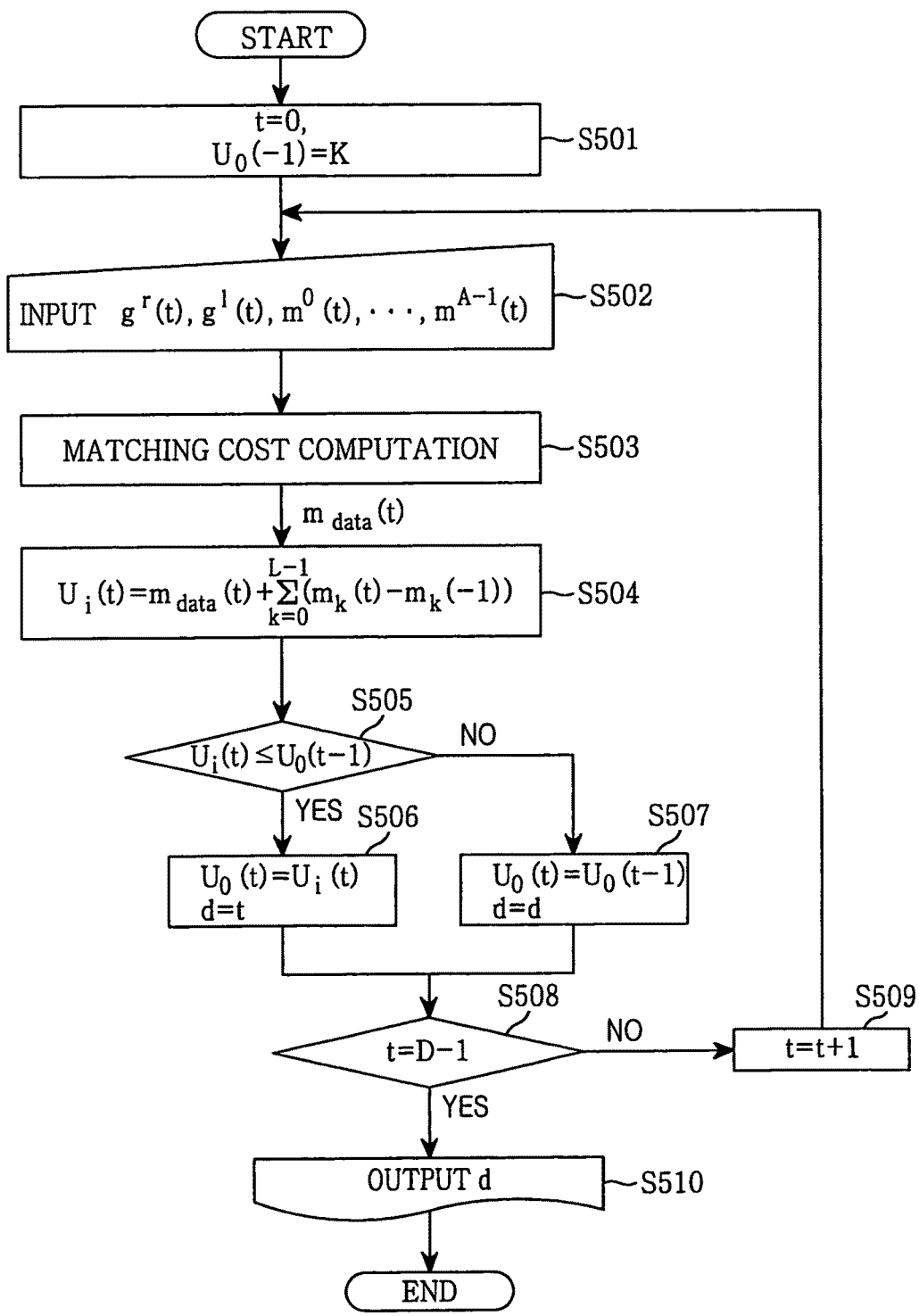
FIG. 17 presents a flow chart of a disparity computation in the algorithms I to IV in accordance with the present invention.

FIG. 17 is a flow chart showing a process of a disparity computation in the algorithms I to IV in accordance with the present invention.

At steps S508 and S509, an input message $m_k(t)$ is a vector in which t has state values ranging from 0 to D−1, and $m_k(-1)$ is an input parameter. $U_0(-1)$ is initialized as K ($U_0(-1)$=K, a maximum possible value) at step S501, and right and left side image pixel data values and respective state values of the input message are inputted in each iteration loop at step S502. Further, a matching cost is computed by using the right and the left side image pixel data values by the matching cost processor of FIG. 11 at step S503, and the computed matching cost is added to a value obtained by subtracting the input parameter from the input message at step S504. A newly computed value $U_i(t)$ is compared to the lowest value $U_0(t-1)$ computed in a previous iteration loop at step S505, and the lowest value $U_0(t)$ in a current iteration loop is computed at steps S506 and S507. Further, when the newly computed value $U_i(t)$ is found to be the lowest value, an iteration loop number t is stored in a d register, and a value d is outputted after all steps have been terminated at step S510. That is, this algorithm is operated such that the lowest value of $U_i(t)$ in all iteration loops is obtained, and a loop number t at that time is outputted as the value d.

Figure 18:
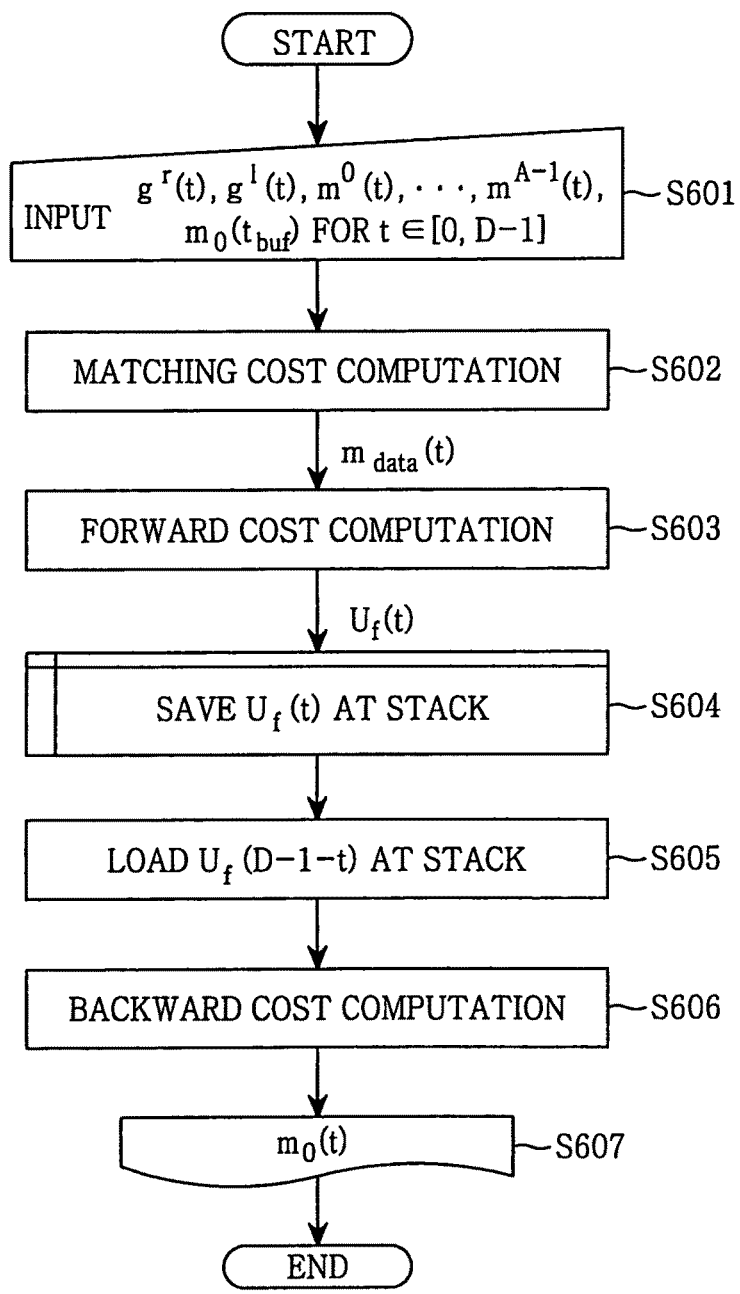
FIG. 18 shows a flow chart of forward, backward, upward and downward message processing in the algorithms I to IV in accordance with the present invention.

FIG. 18 is a flow chart showing the forward, backward, upward and downward message processing in the algorithms I to IV in accordance with the present invention.

The matching cost computation processor of FIG. 8 receives right and left side image pixel data at step S601, and computes matching cost $m_{data}(t)$ at step S602. The forward cost processor of FIG. 8 receives the matching cost $m_{data}(t)$, an input message and $m_0(t_{buf})$ inputted from the recursive buffer of FIG. 8, computes a forward cost at step S603, and then stores the forward cost in a stack at step S604. The backward cost processor of FIG. 8 loads the forward cost at the stack at step S605, and outputs the backward cost at steps S606 and S607. Herein, the output backward cost is inputted to the recursive buffer of FIG. 8, and can be recursively used for performing the algorithm next time. The $m_0(t_{buf})$ is provided as a message input when the forward cost processor performs recursive computation during a procedure for computing forward and downward messages.

Figure 19:
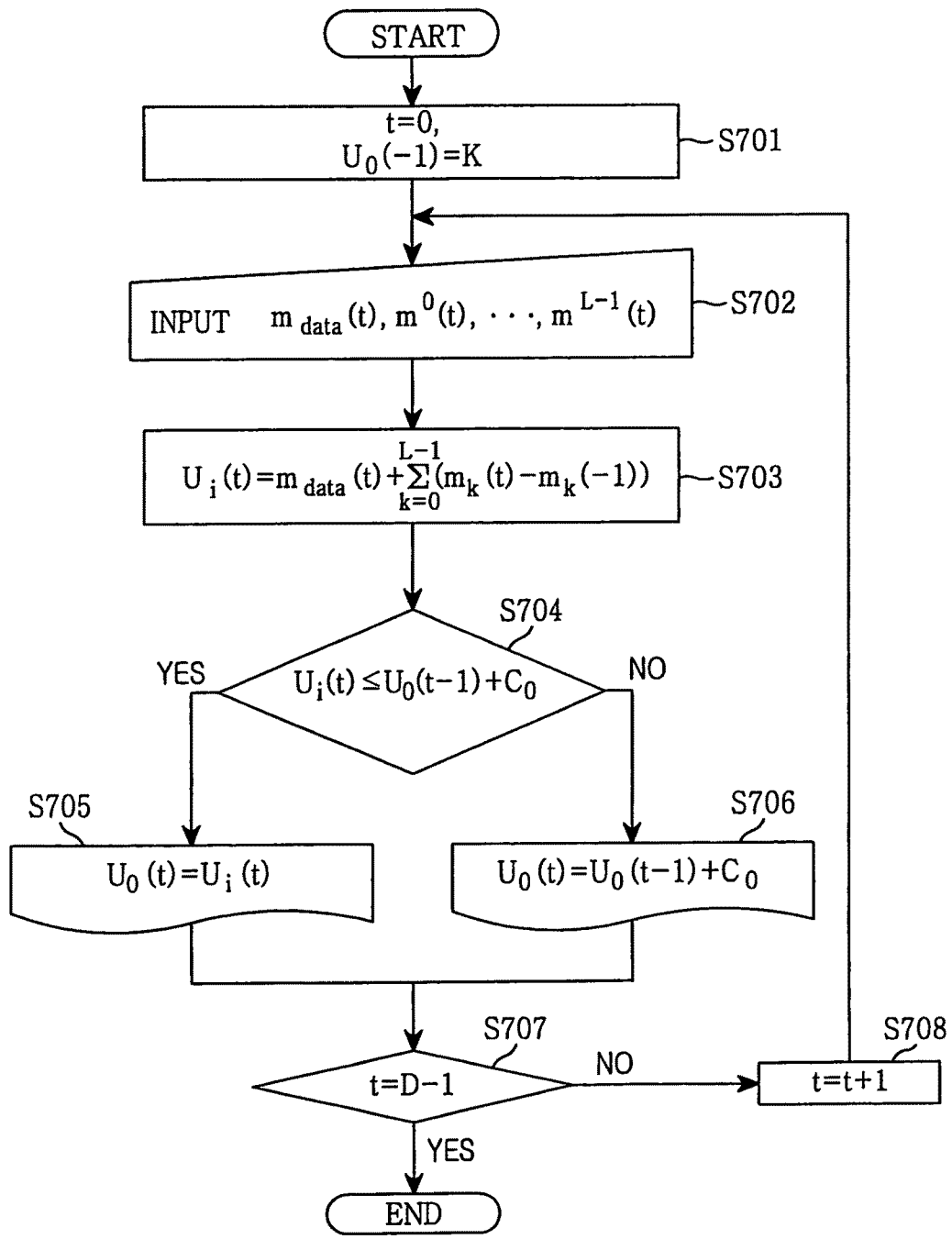
FIG. 19 is a flow chart of the forward cost computation algorithm of FIG. 18.

FIG. 19 is a flow chart showing a process of the forward cost computation algorithm of FIG. 18.

At steps S707 to 709, an input cost $m_k(t)$ is a vector in which t has values ranging from 0 to D−1, and $m_k(-1)$ is an input parameter. $U_0(-1)$ is initialized as K ($U_0(-1)$=K) at step S701, an input cost value is inputted in each iteration loop at step S702, and the input cost value is added to a value obtained by subtracting an input parameter from the input cost at step S703. A newly computed value $U_i(t)$ is compared to $U_0(t-1)+C_0$ computed in a previous iteration loop at step S704, and the lowest value is computed as $U_0(t)$ in a current iteration loop at steps S705 and S706.

Figure 20:
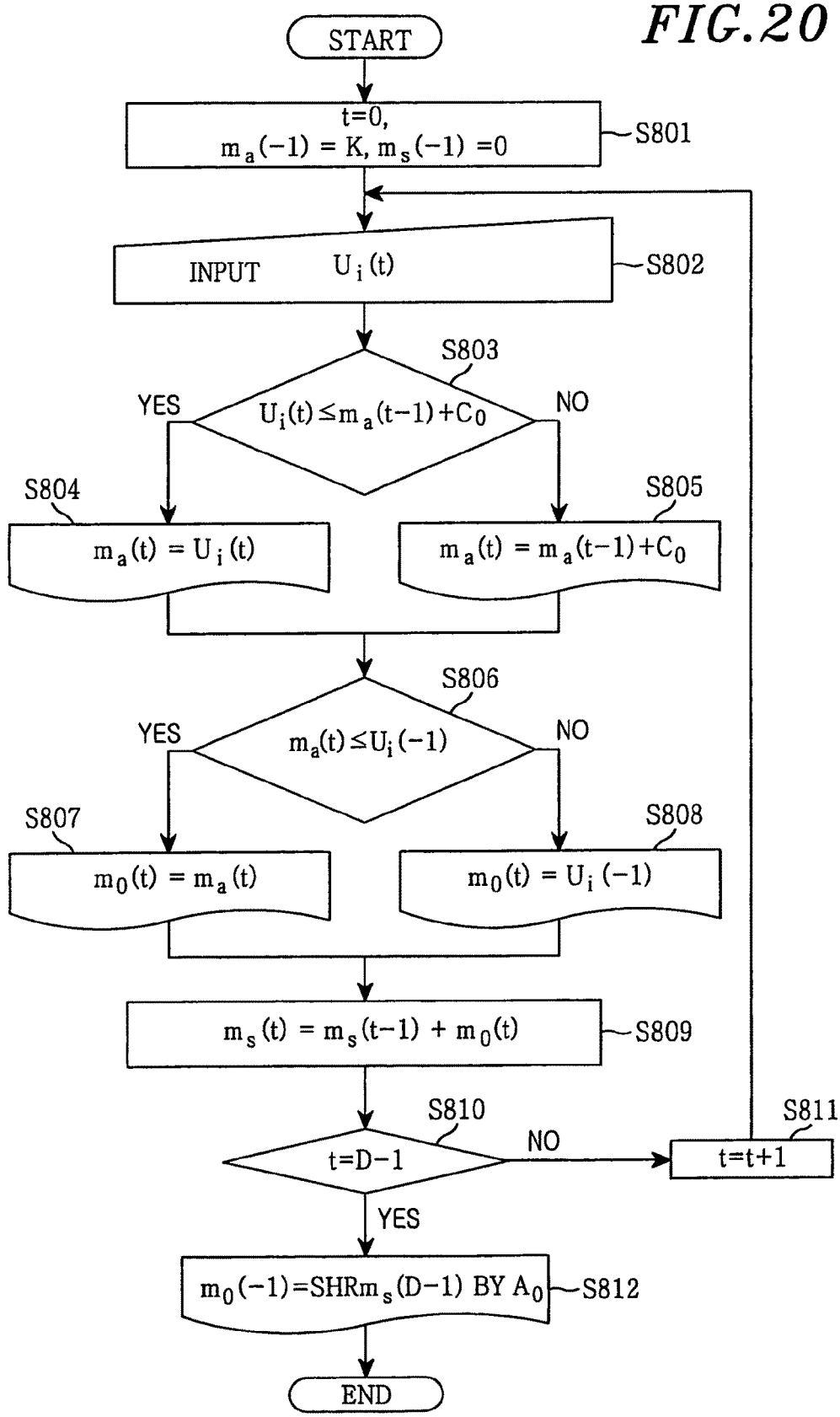
FIG. 20 illustrates a flow chart of the backward cost computation algorithm of FIG. 18.

FIG. 20 is a flow chart showing a process of the backward cost computation algorithm of FIG. 18.

At steps S810 and S811, an input message $U_i(t)$ is a vector in which t has state values ranging from −1 to D−1, and $m_k(-1)$ is an input parameter. $U_0(-1)$ is initialized as K($U_0(-1)$=K), a maximum possible value) at step S801. In each iteration loop, each state value of the forward cost $U_i(t)$ is inputted at step S802. $U_i(t)$ is compared to $m_a(t-1)+C_0$ computed in a previous iteration loop, and the lowest value is set to be the value $m_a(t)$ in a current iteration loop at steps S803 to S805.

Then, $m_a(t)$ is again compared to an input parameter $U_i(-1)$, and the lower value between the two values is computed and outputted as $m_0(t)$ at steps S806 to S808.

After $m_s(t)$ is initialized as 0, it is added to $m_0(t)$ in each iteration loop at step S809, and $m_s(D-1)$ is shifted rightward by $A_0$ in a final iteration loop at step S812. The shifted value is a normalization parameter for a message.

Figure 21:
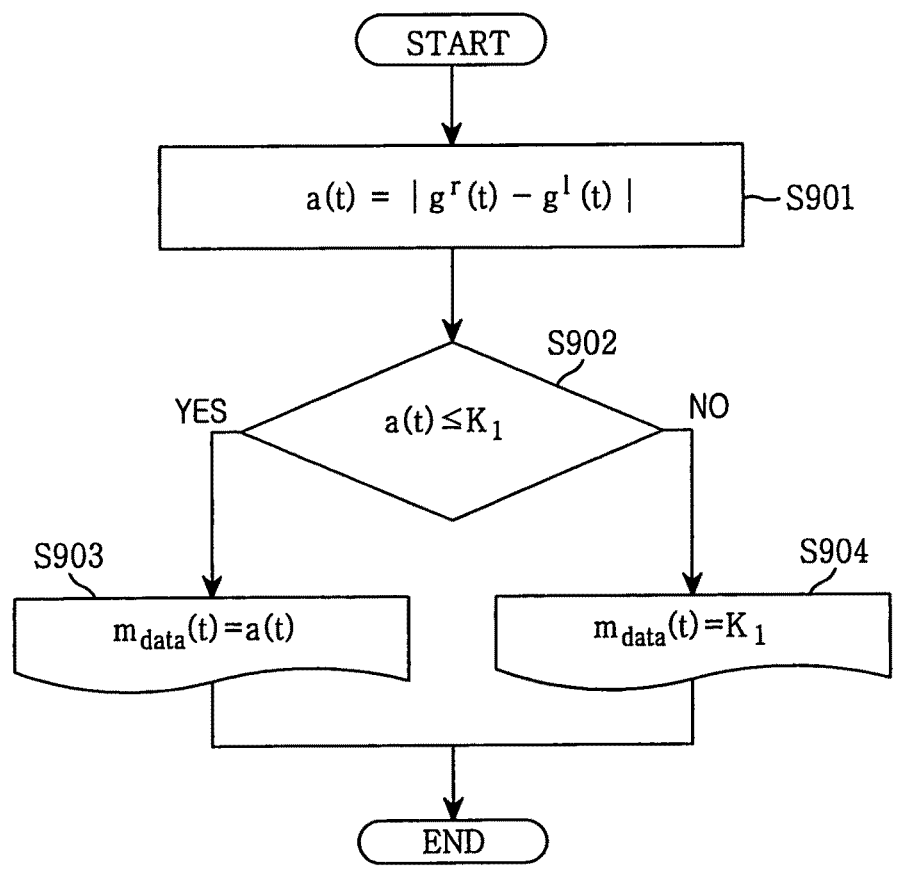
FIG. 21 depicts a flow chart of a matching cost computation algorithm in accordance with the present invention.

FIG. 21 is a flow chart showing a process of a matching cost computation algorithm in the real-time parallel stereo matching system in accordance with the present invention.

First, right and left side image pixel data values are received, and the absolute value a(t) of the difference between the pixel data values is computed at step S901, and is compared to $K_1$ at step S902, and the lower value between the two values is computed as $m_{data}(t)$ at steps S903 and S904.

Figure 22:
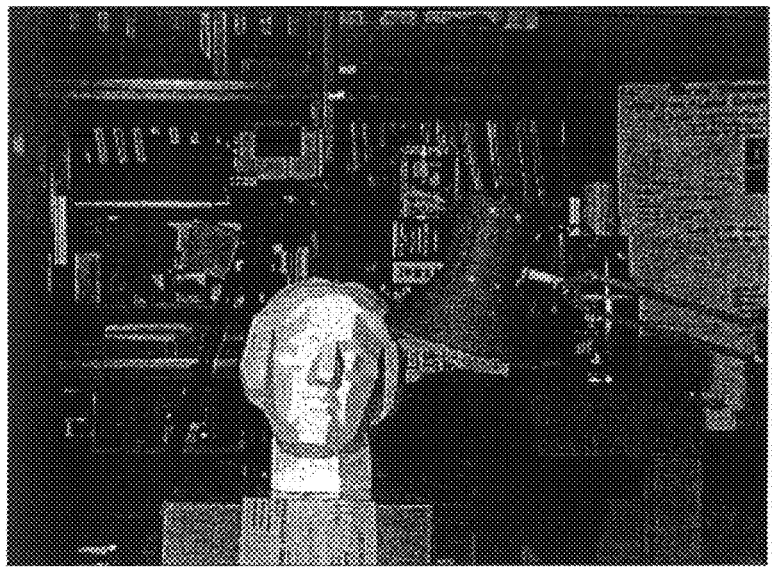
FIGS. 22 to 28 are pictures showing output images to compare the disparity of a conventional image matching method to that of the present invention.
Figure 23:
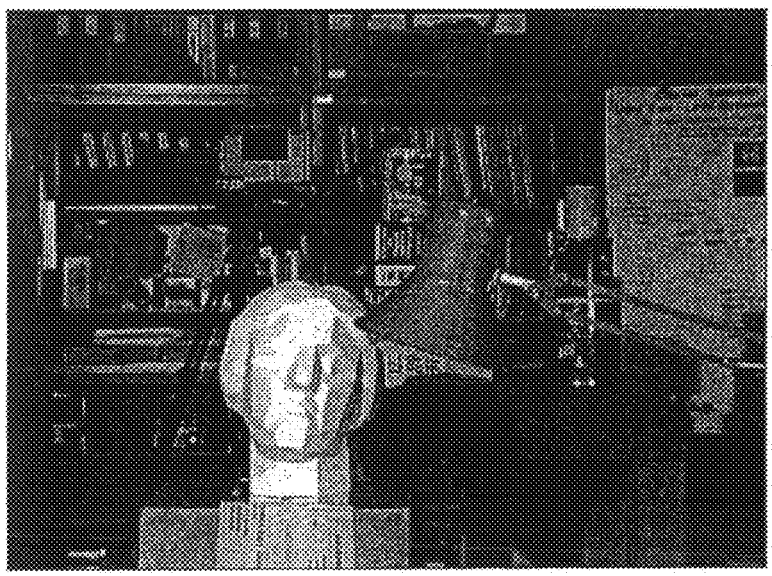
Figure 24:
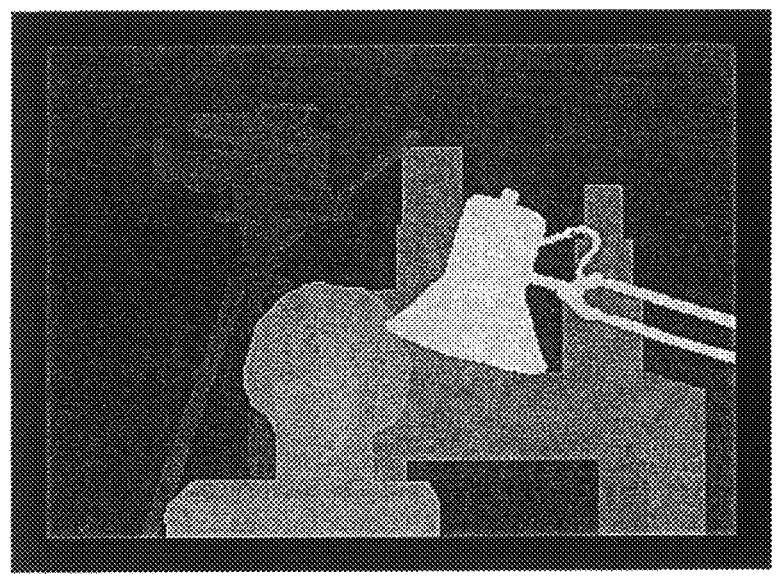
Figure 25:
Figure 26:
Figure 27:
Figure 28:
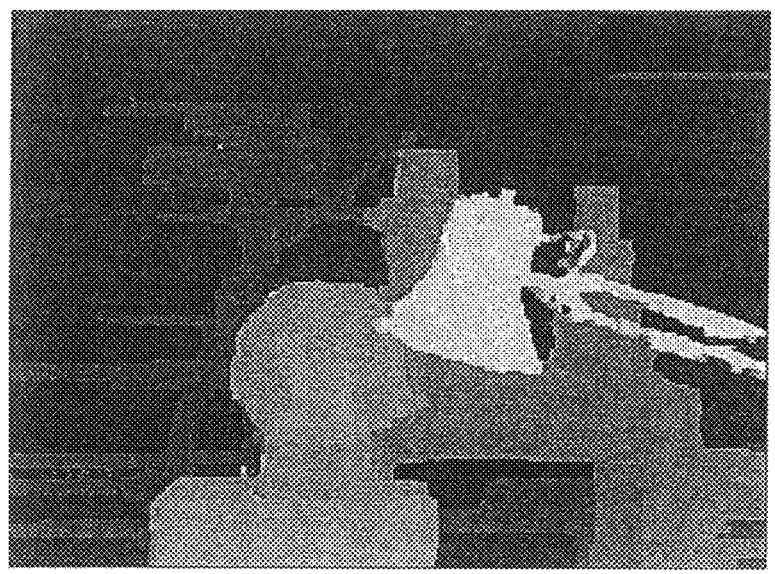

FIGS. 22 and 23 illustrate input right and left side images, and FIG. 24 illustrates a reference disparity output image. FIG. 25 illustrates the computation result of another algorithm using only a single scan line for the right and the left side images (scan line optimization algorithm). FIG. 26 illustrates a disparity output image obtained by performing the algorithm I in accordance with the first embodiment of the present invention, FIG. 27 illustrates a disparity output image obtained by performing the algorithm II in accordance with the second embodiment of the present invention, and FIG. 28 illustrates a disparity output image obtained by performing the algorithm III in accordance with the third embodiment of the present invention or the algorithm IV in accordance with the fourth embodiment of the present invention.

As the algorithm develops from the algorithm I into algorithm II, algorithm III, and then algorithm IV, horizontal stripe noises are eliminated, thus reducing disparity error.

As described above, the present invention can achieve a high-speed processing, because it has a parallel pipeline configuration that can be implemented in the form of VLSI, unlike a conventional sequential software algorithm. That is, the present invention is advantageous in that, since a plurality of image lines are used for matching, the adaptiveness to the surrounding environment can be enhanced and the matching error can be reduced. Further, in accordance with the present invention, by employing an improved parallel pipeline VLSI configuration with a time complexity of O(N), the real-time processing can be implemented effectively.

Further, the present invention is advantageous in that, since a plurality of image lines are used for matching, disparity output image noise can be eliminated, and this it is possible to obtain distance image information that is correct regardless of the conditions of the surrounding environment.

While the invention has been shown and described with respect to the embodiments, it will be understood by those skilled in the art that various changes and modifications may be made without departing from the scope of the invention as defined in the following claims.

The invention claimed is:

1. A stereo image matching system, comprising:
   an image processing unit for converting input images inputted from a first and a second image acquisition unit into digital signals to output first and second pixel data; and
   an image matching unit for computing at least two of an upward, a downward, a forward and a backward message of each pixel by using data values of the first and the second pixel data that are located on a same epipolar line to calculate a disparity value of each pixel, and iteratively repeating said computation by exchanging matching information between adjacent pixels from locations of pixels adjacent a current location of pixels in a 2D grid structure of an image to locations of peripheral pixels, and collecting the messages propagated from peripheral pixels,
   wherein the image matching unit includes:
   a scan line buffer for storing therein the right and the left side image pixel data;
   a forward processor for receiving the right and the left side image pixel data to compute a forward message;
   a stack for saving the forward message computed by the forward processor;
   a backward processor for receiving the right and the left side image pixel data to compute a backward message; and
   a disparity computation processor for receiving the right and the left side image pixel data, the forward message from the stack, and the backward message to compute the disparity value, and
   wherein, in order to calculate the message, the forward, backward, upward and downward processors include:
   a matching cost processor for receiving the right and the left side image pixel data to compute a matching cost;
   a forward cost processor for receiving the matching cost and multiple message values to compute a forward cost;
   a stack for receiving and storing therein the forward cost;
   a backward cost processor for receiving the forward cost from the stack to compute a backward cost; and
   a recursive buffer for allowing the backward cost to be recursively used for subsequent processing.

2. The stereo image matching system a claim 1, wherein the image matching unit performs image matching with respect to every line such that, after a forward processing for computing the forward message in a first horizontal direction with respect to each line to store the computed forward message in the stack has been completed, a backward processing for computing the backward message in a second horizontal direction with respect to said each line is performed to compute the disparity value.

3. The stereo image matching system of claim 1, wherein
   the forward processor further receives a downward message corresponding to an upper adjacent line to compute forward message and
   the backward processor further receives the downward message corresponding to the upper adjacent line to compute the backward message.

4. The stereo image matching system of claim 3, wherein the image matching unit performs image matching by computing the downward message with respect to the upper adjacent line, computing the forward and the backward message by using the computed downward message, computing the disparity value, and computing the downward message with respect to a current line that is to be used for a lower adjacent line.

5. The stereo image matching system of claim 4, wherein the forward processor is operated during the forward processing, and the backward processor, the downward processor and the disparity computation processor are operated during the backward processing.

6. The stereo image matching system of claim 1, wherein the
   forward processor further receives an adjacent upward message corresponding to a lower adjacent line computed in a previous iteration loop and an adjacent downward message corresponding to an upper adjacent line computed in the previous iteration loop to compute the forward message,
   the backward processor further receives the adjacent upward message corresponding to the lower adjacent line computed in the previous iteration loop and the adjacent downward message corresponding to the upper adjacent line computed in the previous iteration loop to compute the backward message, and
   the disparity computation processor further receives the adjacent upward message corresponding to the lower adjacent line computed in the previous iteration loop and the adjacent downward message corresponding to the upper adjacent line computed in the previous iteration loop to compute the disparity value, and further comprising;
   a downward processor for receiving the right and the left side image pixel data, the forward message, the backward message and the adjacent downward message to compute a current downward message corresponding to a current line; and
   an upward processor for receiving the right and the left side image pixel data, the forward message, the backward message and the adjacent upward message to compute a current upward message corresponding to a current line.

7. The stereo image matching system of claim 6, wherein the image matching unit performs the image matching with respect to an entire image repeatedly for a number of times to reduce a noise in a disparity image.

8. The stereo image matching system of claim 6 or 7, wherein the forward processor is operated during the forward processing, and the backward processor, the upward processor, the downward processor and the disparity computation processor are operated during the backward processing.

9. The stereo image matching system of claim 1, wherein the image matching unit includes
   a parallel processor unit having a plurality of said processors arranged in parallel; and
   two or more message buffers for storing therein the upward message and the downward message,
   wherein each of the processors receives the right and the left side image pixel data from the scan tine buffer, the upward message from one of the message buffers that has the upward message stored therein and the downward message from another of the message buffers that has the downward message stored therein to process each image line, and then said each of the processors stores the downward message in said one of the message buffers and the upward message in said another of the message buffers.

10. The stereo image matching system of claim 9, wherein the image matching system processing a plurality of lines by simultaneously operating the processors arranged in parallel.

11. The stereo image matching system of claim 9, wherein the parallel processor unit includes:
   a forward processor for receiving the right and the left side image pixel data, an adjacent upward message corresponding to a lower adjacent line from an adjacent one of the message buffers and an adjacent downward message corresponding to a upper adjacent line from another adjacent one of the message buffers to compute a forward message;
   a stack for storing therein the computed forward message;
   a backward processor for receiving the right and the left side image pixel data, the adjacent upward message corresponding to the lower adjacent line from said adjacent one of the message buffers and the adjacent downward message corresponding: to the upper adjacent line from said another adjacent one of the message buffers to compute a backward message;
   a disparity computation processor for receiving the right and the left side image pixel data the forward message from the stack, the backward message, the adjacent upward message, and the adjacent downward message to compute a disparity value;
   a downward processor for receiving the right and the left side image pixel data, the forward message, the backward message and the adjacent downward message to compute a current downward message; and
   an upward processor for receiving the right and the left side image pixel data, the forward message, the backward message, and the adjacent upward message to compute a current upward message.

12. The stereo image matching system of claim 9, wherein the image matching unit performs image matching with respect to an entire image repeatedly for a number of times, and a number of processors processes a number of lines parallelly, the number of the processors being equal to that of the lines.

13. The stereo image matching system of claim 9 or 12, wherein each of the processors are operated parallelly, the forward processor being operated during forward processing, and the backward processor, the upward processor, the downward processor and the disparity computation processor being operated during backward processing.

14. The stereo image matching system of claim 1, wherein the forward cost processor includes:
   a subtractor for subtracting an input parameter from the received multiple message values;
   a first adder for adding an output value of the subtractor to the matching cost;
   a first delay buffer for delaying a first input value by 1 clock;
   a second adder for adding an output value of the first delay buffer to a specific control parameter;
   a first comparator for outputting a lower value between an output value of the first adder and an output value of the second adder to the first delay buffer as the first input value;
   a second comparator for outputting a lower value between the output value of the first adder and a second input value;
   a second delay buffer for delaying an output value of the second comparator by 1 clock to provide the delayed value to the second comparator as the second input value; and
   a third adder for adding a control parameter to the output value of the second comparator.

15. The stereo image matching system of claim 1, wherein the backward cost processor includes:
   a first comparator for selecting a lower value between the inputted forward cost and a comparative input value;
   a first delay buffer for delaying an output value of the first comparator by 1 clock;
   a first adder for adding an output value of the first delay buffer to a specific control parameter to provide the added value to the first comparator as the comparative input value;
   a second comparator for outputting a lower value between an output value of the first comparator and an input parameter;
   a second adder for adding an output value of the second comparator to an additional input value;
   a second delay buffer for delaying an output value of the second adder by 1 clock to provide the delayed value to the second adder as the additional input value; and
   a shifting unit for shifting the output value of the second adder by a specific amount to output the shifted value as a parameter.

16. The stereo image matching system of 1, wherein the matching cost processor includes:
   an absolute difference computation unit for receiving the right and the left side image pixel data to compute an absolute value of a difference between the right and the left side image pixel data; and
   a comparator for outputting a lower value between an output value of the absolute difference computation unit and a control parameter, 17. The stereo image matching system of 1, wherein the disparity computation processor includes:
   a subtractor for subtracting an input parameter from the inputted message values;
   a matching cost processor for computing matching cost by using the right and the left side image pixel data
   an adder for adding an output value of the subtractor to an output value of the matching cost processor;
   a comparator for outputting a lower value between an output value of the adder and a secondary input value;
   a delay buffer for delaying an output value of the comparator by 1 clock to provide the delayed value to the comparator as the secondary input value;
   a counter for indicating a step number of each iteration loop of the disparity computation processor; and
   a disparity output buffer for storing an output value of the counter if the output value of the comparator is the output value of the adder.

18. The stereo image matching system of 1, wherein the disparity computation processor performs the steps of:
   receiving the right and the left side image pixel data and a state value of an input message value in each iteration loop;
   computing the matching cost;
   adding the input message value to a value obtained by subtracting an input parameter from the computed matching cost;

comparing a newly computed value with a previous lowest value computed in a previous iteration loop to compute a current lowest value in a current iteration loop;

storing a step number of the current iteration loop in a register when the newly computed value is the current lowest value; and outputting the value stored in the register after all the iteration loops have been completed.

19. The stereo image matching system of 1, wherein the forward and the backward processor perform a forward processing in which the forward cost processor computes the forward cost in each clock step by using a cost value computed by the matching cost computation processor, an input message value and a cost value stored in the recursive buffer to store the computed forward cost in the stack, and, wherein, after the forward processing has been completed, the forward and the backward processor perform a backward processing in which the backward cost processor computes the forward cost from the stack to output a backward cost, and inputs the outputted backward cost to the recursive buffer.

20. The stereo image matching system of claim 19, wherein the forward cost processor performs the steps of initializing the delay buffer by a maximum possible value;

reading an input cost in each iteration loop;

adding an input message value to a value obtained by subtracting an input, parameter from the input cost;

outputting a lower value between the added value a value obtained by adding a control parameter to a previous value stored in. the delay buffer, and storing the lower value in the delay buffer.

21. The stereo image matching system of claim 19, wherein the backward cost processor performs the steps of initializing the first delay buffer by a maximum possible value;

initializing the second delay buffer by 0;

reading the forward cost in each iteration loop;

comparing the forward cost with a comparative value obtained by adding a control. parameter to a value stored in the first delay buffer;

storing in the first delay buffer a lower value between the forward cost and the comparative value;

outputting a lower value between an output value of the first delay buffer and an input parameter;

adding a current output value of the first delay buffer to a previous output value of the first delay buffer in each iteration loop to store the added value in the second delay buffer; and shifting the stored value in the second delay buffer by a specific amount to compute and output a parameter.

* * * * *